(12) United States Patent
Matsushita

(10) Patent No.: US 11,011,792 B2
(45) Date of Patent: May 18, 2021

(54) POWER STORAGE DEVICE

(71) Applicant: Toyota Jidosha Kabushiki Kaisha, Toyota (JP)

(72) Inventor: Taro Matsushita, Toyokawa (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 113 days.

(21) Appl. No.: 16/298,323

(22) Filed: Mar. 11, 2019

(65) Prior Publication Data
US 2019/0288253 A1    Sep. 19, 2019

(30) Foreign Application Priority Data

Mar. 14, 2018 (JP) .............................. JP2018-046856

(51) Int. Cl.
*H01M 50/20* (2021.01)

(52) U.S. Cl.
CPC ........ *H01M 50/20* (2021.01); *H01M 2220/20* (2013.01)

(58) Field of Classification Search
CPC ........... H01M 2220/20; H01M 2/1077; H01M 2/1083
See application file for complete search history.

(56) References Cited

U.S. PATENT DOCUMENTS

| 10,283,743 B2 * | 5/2019 | Fujiwara | B60L 50/64 |
| 2016/0315299 A1 * | 10/2016 | Kishii | H01M 2/1077 |

FOREIGN PATENT DOCUMENTS

JP     2016-115599 A    6/2016

* cited by examiner

*Primary Examiner* — Carlos Barcena
(74) *Attorney, Agent, or Firm* — Dinsmore & Shohl LLP

(57) ABSTRACT

A power storage device includes a holder that includes a plurality of hole rows having a plurality of insertion holes and is provided to be longer in a longitudinal direction than in a width direction. The holder includes a first long side surface, a second long side surface, a first fragile portion, and a second fragile portion. A first thin portion of the holder is disposed adjacent to a fourth insertion hole in the width direction. A second thin portion of the holder is disposed adjacent to the first insertion hole in the width direction. When a virtual straight line passing through the first thin portion and the second thin portion is taken as a virtual breaking line, the first fragile portion and the second fragile portion are disposed at positions through which the virtual breaking line passes or in a vicinity of the virtual breaking line.

12 Claims, 17 Drawing Sheets

POWER STORAGE DEVICE

CROSS-REFERENCE TO RELATED APPLICATION

This application claims priority to Japanese Patent Application No. 2018-046856 filed on Mar. 14, 2018, incorporated herein by reference in its entirety.

BACKGROUND

1. Technical Field

The disclosure relates to a power storage device.

2. Description of Related Art

As a power storage device, a power storage device including a plurality of cylindrical batteries is known, and for example, a power storage device including a plate-shaped holder in which a plurality of insertion holes is formed and a plurality of cylindrical batteries inserted into the insertion holes is known.

In the power storage device as described above, when a large external force is applied to the holder from the outside, the holder deforms. As the holder deforms, the cylindrical battery inserted into the holder is likely to be damaged.

Therefore, a power storage device has been suggested, in which damage to the cylindrical battery is suppressed even when a large external force is applied to the holder from the outside. For example, Japanese Unexamined Patent Application Publication No. 2016-115599 (JP 2016-115599 A) discloses a power storage device that includes a plurality of cylindrical batteries and a holder. In JP 2016-115599 A, the holder has a rectangular shape in a plan view, and the peripheral surface of the holder includes a pair of long side surfaces.

In the holder, a plurality of insertion holes into which the cylindrical batteries are inserted is formed, and on each long side surface of the holder, a fragile portion is formed.

In the power storage device described above, when an external force is applied to a power storage module, stress is concentrated on the fragile portion formed on each long side surface, breakage starts from each fragile portion, and the holder is split.

Thus, in the power storage device disclosed in JP 2016-115599 A, when a large external force is applied to the power storage device, the holder is configured to be divided before the holder is greatly deformed by the external force. Then, when the holder is divided, a plurality of holder pieces is produced, and each holder piece is displaced relative to each other.

In this way, the damage to the cylindrical battery is suppressed by dividing the holder and moving the cylindrical battery along with each holder piece before the holder is deformed by the external force.

SUMMARY

In the power storage device, when an external force is applied to the holder and the holder is broken, it is likely that the breaking line of the holder passes through the insertion hole. Then, when the external force is further applied to one holder piece, the holder piece relatively moves with respect to the other holder piece along the breaking line. In this case, when the breaking line passes the insertion hole, the cylindrical battery inserted in the insertion hole is likely to be deformed or damaged as the holder piece moves.

The disclosure provides a power storage device in which passing of a breaking line of a holder through an insertion hole is suppressed when an external force is applied to the holder.

An aspect of the present disclosure relates to a power storage device including a holder and a unit battery. The holder includes a plurality of hole rows having a plurality of insertion holes and is provided to be longer in a longitudinal direction than in a width direction, and the unit battery is inserted into each of the insertion holes. The holder includes a first long side surface and a second long side surface extending in the longitudinal direction and arranged in the width direction. The holder includes a first fragile portion on the first long side surface. The holder includes a second fragile portion on the second long side surface. The plurality of hole rows include a first hole row and a second hole row closer to the second long side surface than the first hole row.

The first hole row includes a first insertion hole and a second insertion hole adjacent to the first insertion hole in the longitudinal direction. The second hole row includes a third insertion hole and a fourth insertion hole adjacent to the third insertion hole in the longitudinal direction.

A first thin portion of the holder positioned between the first insertion hole and the second insertion hole is disposed adjacent to the fourth insertion hole in the width direction. A second thin portion of the holder positioned between the third insertion hole and the fourth insertion hole is disposed adjacent to the first insertion hole in the width direction.

When a virtual straight line passing through the first thin portion and the second thin portion is taken as a virtual breaking line, the first fragile portion and the second fragile portion are disposed at positions through which the virtual breaking line passes or in a vicinity of the virtual breaking line.

With the power storage device according to the aspect of the disclosure, when a large external force is applied to the holder on the first long side surface, cracks develop from the first and second fragile portions. Since the first fragile portion and the second fragile portion are disposed at the positions through which the virtual breaking line passes or in the vicinity of the virtual breaking line, the breaking lines developing from the first fragile portion and the second fragile portion tend to reach the virtual breaking line.

When each crack reaches the virtual breaking line, the holder is mainly connected by the first thin portion and the second thin portion, and thus stress tends to concentrate on the first fragile portion and the second fragile portion. As a result, the breaking line is formed to pass through the first fragile portion and the second fragile portion, and the holder is split such that two holder pieces are formed.

In this way, when the holder is broken, the breaking line easily passes through the thin portion, and the passage of the breaking line through the insertion hole is suppressed. Therefore, it is possible to suppress damage to the unit battery when the holder pieces move relatively.

In the power storage device according to the aspect, the virtual breaking line may include a first portion positioned on the first long side surface and a second portion positioned in the first thin portion, and when a line segment of the virtual breaking line positioned between the first portion and the second portion is taken as a first virtual line segment and a portion of the holder which is positioned close to the first long side surface with respect to the first virtual line segment is taken as a first region, at least a part of the first fragile portion may be positioned in the first region when the first fragile portion is positioned in the vicinity of the virtual breaking line.

With the power storage device according to the aspect of the disclosure, a crack developing from the first fragile portion easily reaches the virtual breaking line.

In the power storage device according to the aspect, the plurality of hole rows may include a third hole row provided at a position adjacent to the second long side surface, the third hole row may include a fifth insertion hole and a sixth insertion hole adjacent to the fifth insertion hole in the longitudinal direction, the virtual breaking line may pass through a third thin portion positioned between the fifth insertion hole and the sixth insertion hole, the virtual breaking line may include a third portion positioned on the second long side surface and a fourth portion positioned in the third thin portion, and when a line segment of the virtual breaking line positioned between the third portion and the fourth portion is taken as a second virtual line segment and a portion of the holder which is positioned close to the second long side surface with respect to the second virtual line segment is taken as a second region, at least a part of the second fragile portion may be positioned in the second region when the second fragile portion is positioned in the vicinity of the virtual breaking line.

With the power storage device according to the aspect of the disclosure, a crack developing from the second fragile portion easily reaches the virtual breaking line.

In the power storage device according to the aspect, the insertion holes of each of the hole rows may be arranged in the longitudinal direction, each of the hole rows may be arranged in the width direction, and the virtual breaking line may pass through the thin portion positioned between the insertion holes in each of the hole row.

With the power storage device according to the aspect of the disclosure, the breaking line easily passes through each thin portion, and thus it is possible to suppress passage of the breaking line through the insertion hole.

In the power storage device according to the aspect, the holder may include a third fragile portion on the first long side surface, when a virtual line passing through the second fragile portion and extending in the width direction is taken as a symmetrical virtual line, the first hole row may include a seventh insertion hole and an eighth insertion hole provided symmetrically with the first insertion hole and the second insertion hole with respect to the symmetrical virtual line, a fourth thin portion may be included between the seventh insertion hole and the eighth insertion hole, the second hole row may include a ninth insertion hole and a tenth insertion hole provided symmetrically with the third insertion hole and the fourth insertion hole with respect to the symmetrical virtual line, a fifth thin portion may be included between the ninth insertion hole and the tenth insertion hole, and when a virtual straight line passing through the fourth thin portion and the fifth thin portion is taken as another virtual breaking line, the third fragile portion may be disposed at a position through which the other virtual breaking line passes, or in a vicinity of the other virtual breaking line.

With the power storage device according to the aspect of the disclosure, the breaking line is easily formed to pass through the fourth thin portion and the fifth thine portion, and thus it is possible to suppress passage of the breaking line through the insertion hole.

With the power storage device according to the aspect of the disclosure, it is possible to suppress passage of the breaking line of the holder through the insertion hole when an external force is applied to the holder.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION

Power storage devices according to Embodiments 1, 2 will be described with reference to FIGS. 1 to 23. The same constituent elements through FIGS. 1 to 23 are denoted by the same reference signs and thus descriptions thereof will not be repeated (in the present specification, "the same configuration" includes "substantially the same configuration" in its meaning).

Embodiment 1

Figure 1:
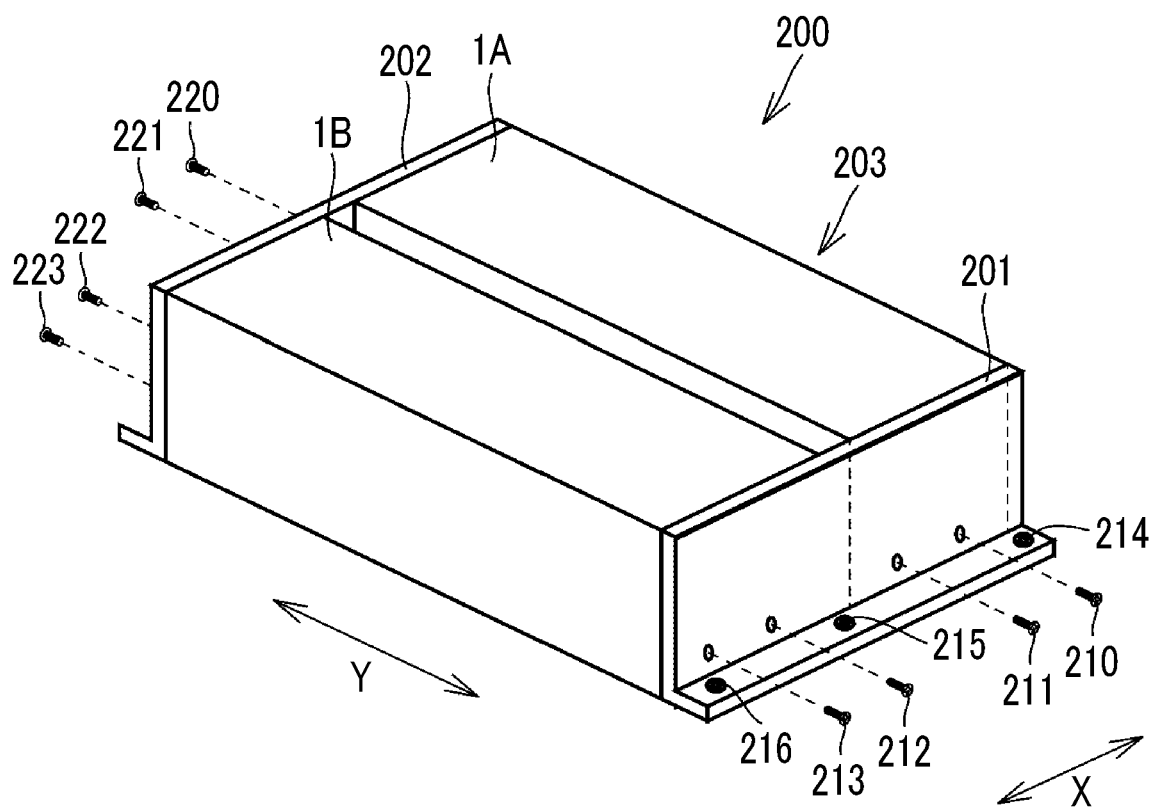
FIG. 1 is a schematic view of a battery pack.

FIG. 1 is a schematic view of a battery pack 200. The battery pack 200 includes power storage devices 1A, 1B, and fixation plates 201, 202.

The power storage devices 1A, 1B are disposed at an interval in an X direction. The fixation plate 201 is fixed to a first end of the power storage device 1A by bolts 210, 211, and is fixed to a first end of the power storage device 1B by bolts 212, 213.

The fixation plate 201 is fixed to a floor panel or the like of a vehicle by bolts 214, 215, 216. In this way, the fixation plate 201 connects the power storage devices 1A, 1B to each other, and fixes the power storage devices 1A, 1B to the floor panel.

The fixation plate 202 is fixed to a second end of the power storage device 1A by bolts 220, 221, and is fixed to a second end of the power storage device 1B by bolts 222, 223. The fixation plate 202 is also fixed to the floor panel by bolts (not shown).

In this way, the fixation plate 202 also connects the power storage devices 1A, 1B to each other and fixes the power storage devices 1A, 1B to the floor panel.

Next, the configuration of the power storage device 1A will be described. Since the configurations of the power storage devices 1A, 1B are the same, the configuration of the power storage device 1A will be mainly described.

Figure 2:
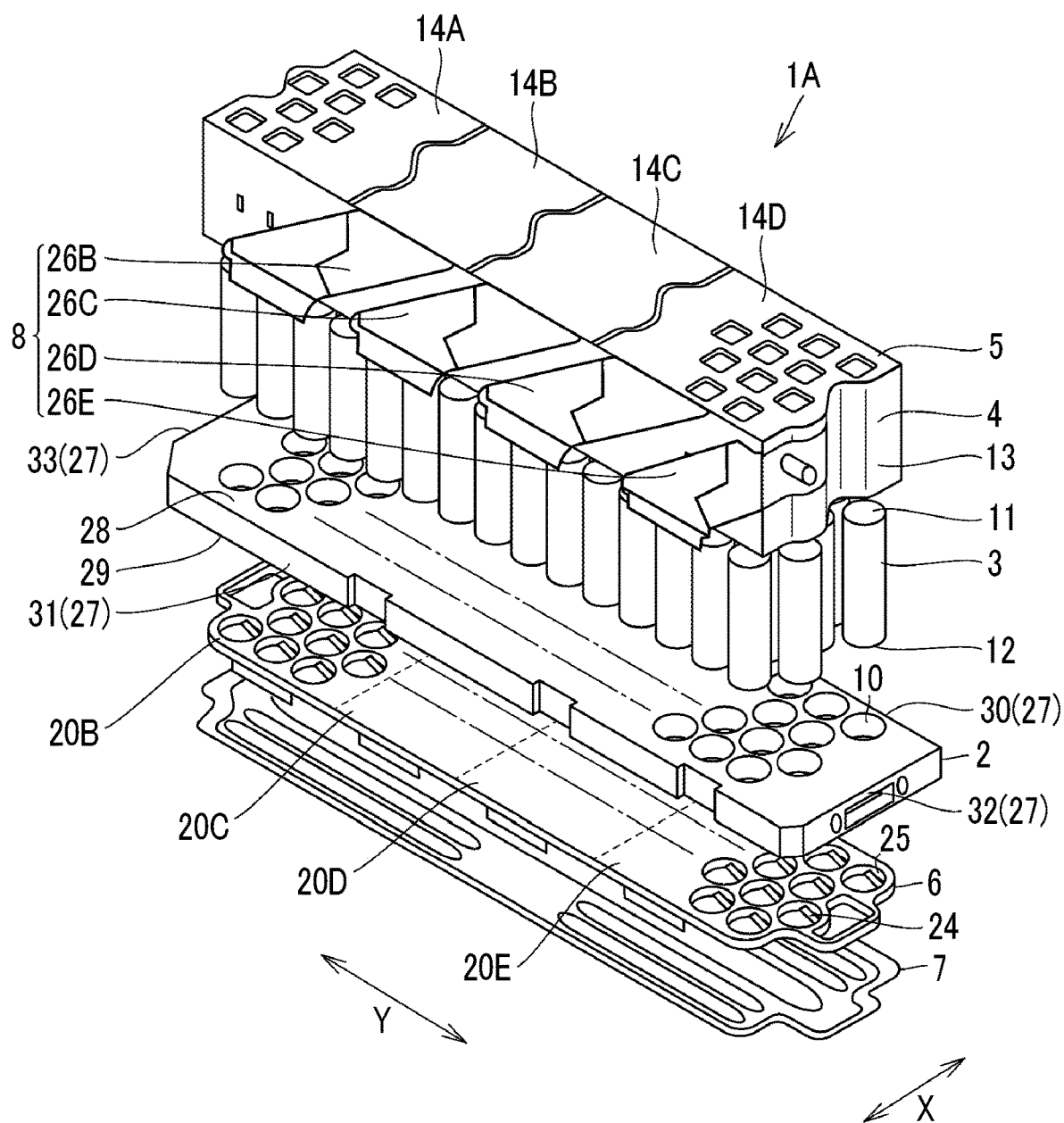
FIG. 2 is an exploded perspective view of a power storage device.

FIG. 2 is an exploded perspective view of the power storage device 1A. The power storage device 1A includes a holder 2, cylindrical batteries 3, a resin case 4, a positive electrode bus bar module 5, a negative electrode bus bar module 6, an undercover 7, and a connection bus bar module 8.

The holder 2 is formed in a substantially plate shape, and, for example, the holder 2 is formed of a metal material. A plurality of insertion holes 10 penetrating vertically is formed in the holder 2. The specific configuration of the holder 2 will be described later.

The power storage device 1A includes a plurality of cylindrical batteries 3, and cylindrical batteries 3 are each inserted into the insertion holes 10. A positive electrode 11 is formed at the upper end of the cylindrical battery 3 and a negative electrode 12 is formed at the lower end of the cylindrical battery 3. The upper end of each cylindrical battery 3 protrudes from the top surface of the holder 2. The resin case 4 is provided to cover the cylindrical batteries 3 from above.

The positive electrode bus bar module 5 includes a plurality of positive electrode bus bars 14A, 14B, 14C, 14D, the positive electrode bus bars 14A, 14B, 14C, 14D are arranged at intervals in a Y direction, and the positive electrode bus bars 14A, 14B, 14C, 14D each connect the positive electrodes 11 of cylindrical batteries 3 in parallel.

The negative electrode bus bar module 6 includes a plurality of negative electrode bus bars 20B, 20C, 20D, 20E, the negative electrode bus bars 20B, 20C, 20D, 20E are arranged at intervals in the Y direction, and the negative electrode bus bars 20B, 20C, 20D, 20E each connect the negative electrodes 12 of the cylindrical batteries 3 in parallel.

The connection bus bar module 8 includes a plurality of connection bus bars 26B, 26C, 26D, 26E. The connection bus bar 26B connects the positive electrode bus bar 14B and the negative electrode bus bar 20B to each other. The connection bus bars 26C, 26D connect the positive electrode bus bars 14C, 14D and the negative electrode bus bars 20C, 20D, respectively. The connection bus bar 26E is connected to the negative electrode bus bar 20E.

Next, a configuration of the holder 2 will be described in detail. The holder 2 is formed in a plate shape, and the holder 2 includes a top surface 28, a bottom surface 29, and peripheral surfaces 27.

Figure 3:
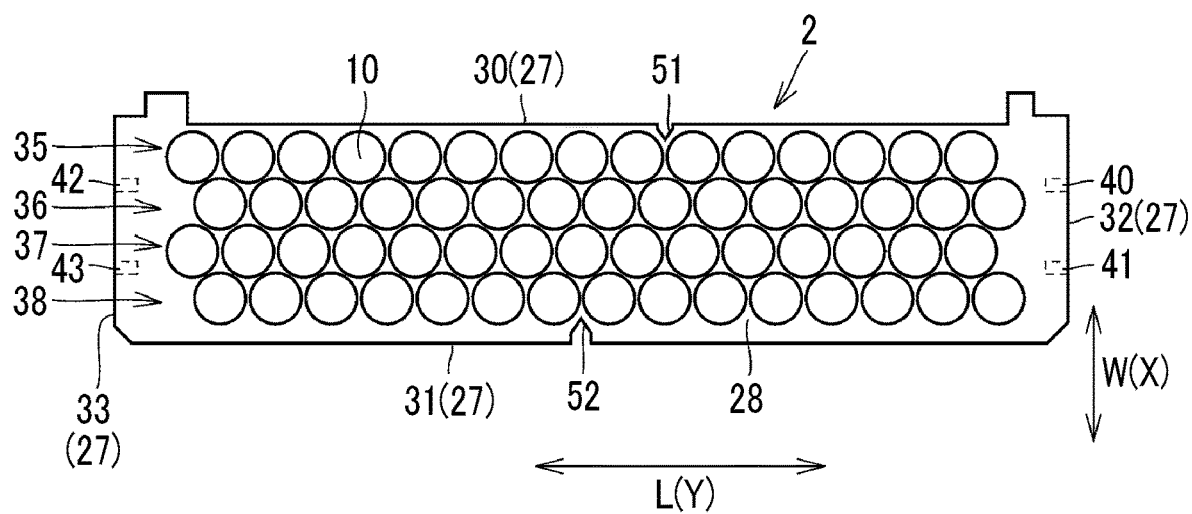
FIG. 3 is a plan view of a holder when viewed from above the holder.

FIG. 3 is a plan view illustrating the holder 2, and is a plan view when viewed from above the holder 2. As illustrated in FIG. 3, the holder 2 has a rectangular shape. A length of the holder 2 in the longitudinal direction L is longer than that of the holder 2 in the width direction W.

In FIG. 3, the holder 2 is disposed such that the width direction W coincides with the X direction and the longitudinal direction L coincides with the Y direction.

The peripheral surfaces 27 of the holder 2 includes long side surfaces 30, 31, and short side surfaces 32, 33. In FIG. 1, the long side surface 30 is positioned on the outer surface 203 of the battery pack 200, and the long side surface 31 is positioned on the power storage device 1B side.

Returning to FIG. 3, the long side surfaces 30, 31 extend in the longitudinal direction L, and the long side surfaces 30, 31 are arranged in the width direction W. The short side surfaces 32, 33 extend in the width direction W and are arranged in the longitudinal direction L.

In the short side surface 32, bolt holes 40, 41 are formed, and in the short side surface 33, bolt holes 42, 43 are formed.

The bolts 210, 211 in FIG. 1 are inserted into the bolt holes 40, 41, and the fixation plate 201 in FIG. 1 is fixed to the holder 2. Similarly, the bolts 220, 221 are inserted into the bolt holes 42, 43 and the fixation plate 202 in FIG. 1 is fixed to the holder 2.

In this way, the short side surface 32 of the holder 2 is fixed to the floor panel by the fixation plate 201, and the short side surface 33 of the holder 2 is fixed to the floor panel by the fixation plate 202. Therefore, the holder 2 is substantially fixed at both ends.

In the holder 2, a plurality of hole rows 35, 36, 37, 38 is formed. The hole row 35 is formed by a plurality of insertion holes 10 arranged at equal intervals in the longitudinal direction L with a space therebetween. Similarly, the hole rows 36, 37, 38 are each formed by a plurality of insertion holes 10 arranged at equal intervals in the longitudinal direction L with a space therebetween.

The insertion hole 10 is formed to extend from the top surface 28 of the holder 2 to the bottom surface, and the opening of each insertion hole 10 is formed in a circular shape, and the radius of each opening is "R".

The hole row 35 (which is an example of the first hole row) is formed close to the long side surface 30, and the hole row 36 (which is an example of the second hole row) is formed at a position closer to the long side surface 31 (which is an example of the second long side surface) than the hole row 35. The hole row 36 is shifted to the short side surface 32 by a half of about the radius R compared to the hole row 35.

The hole row 37 is formed at a position closer to the long side surface 31 than the hole row 36, and the hole row 37 is shifted to the short side surface 33 by about the radius R compared to the hole row 36.

The hole row 38 is formed at a position closer to the long side surface 31 than the hole row 37, and the hole row 38 is shifted to the short side surface 32 by about the radius R compared to the hole row 37. The hole row 38 (which is an example of the third hole row) is formed adjacent to the long side surface 31. That is, the insertion holes 10 in the holder 2 are formed in a zigzag shape.

Figure 4:
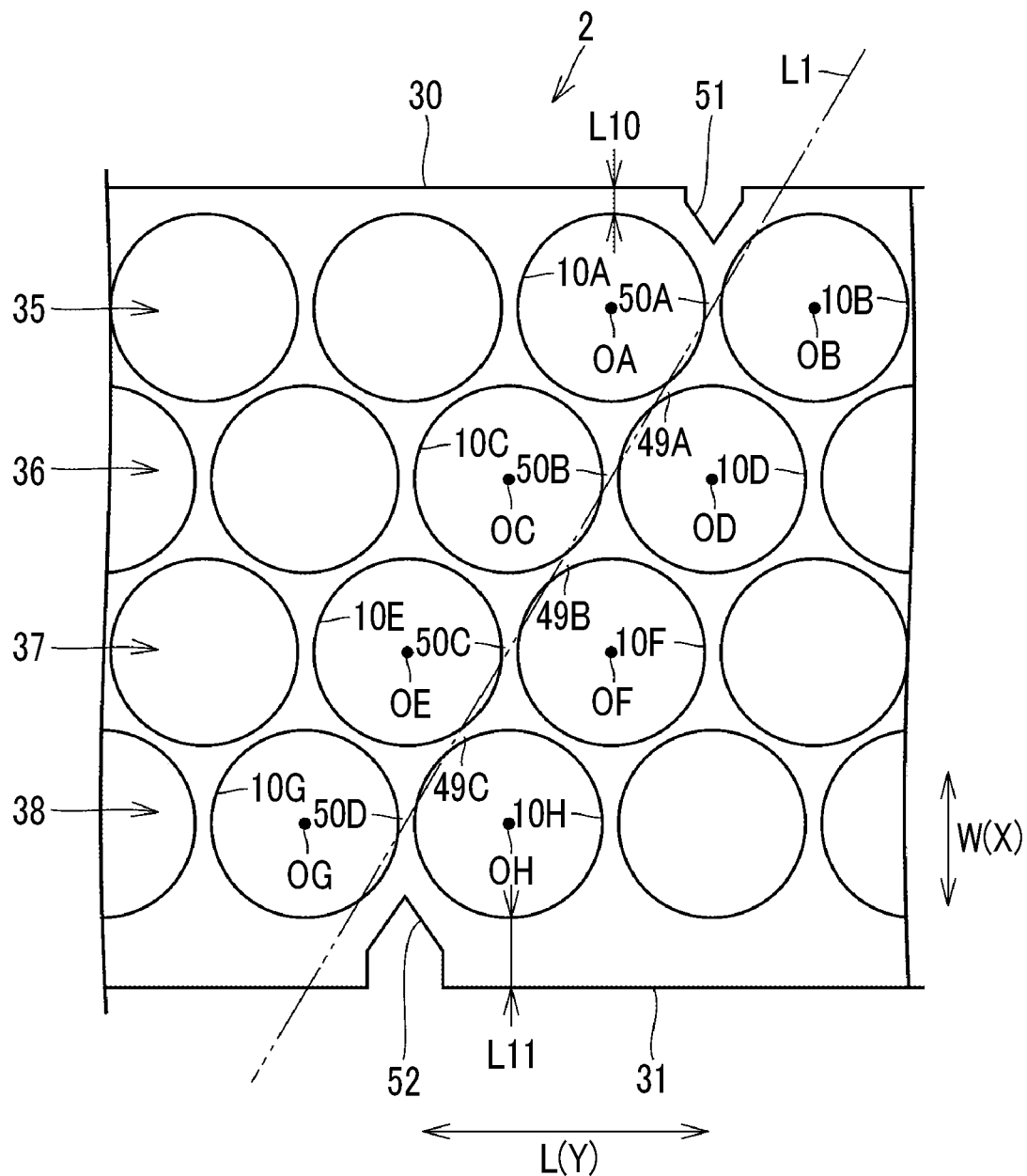
FIG. 4 is an enlarged plan view of a part of the holder illustrated in FIG. 3.

FIG. 4 is an enlarged plan view of a part of the holder 2 illustrated in FIG. 3. The hole row 35 includes an insertion hole 10A (which is an example of the first insertion hole) and an insertion hole 10B (which is an example of the second insertion hole).

The insertion hole 10B is formed to be adjacent to the insertion hole 10A in the longitudinal direction L. In a portion of the holder 2 positioned between the insertion hole 10A and the insertion hole 10B, a thin portion 50A (which is an example of the first thin portion) is formed.

The hole row 36 includes an insertion hole 10C (which is an example of the third insertion hole) and an insertion hole 10D (which is an example of the fourth insertion hole). The insertion hole 10D is formed to be adjacent to the insertion hole 10C in the longitudinal direction L. A thin portion 50B (which is an example of the second thin portion) is formed between the insertion hole 10C and the insertion hole 10D in the holder 2.

The thin portion 50A (which is an example of the first thin portion) and the insertion hole 10D (which is an example of the fourth insertion hole) are adjacent to each other in the width direction W, and specifically, the thin portion 50A and the center OD of the opening of the insertion hole 10D are adjacent to each other in the width direction W.

Further, the insertion hole 10A (which is an example of the first insertion hole) and the thin portion 50B (which is the example of the second thin portion) are adjacent to each other in the width direction W, and specifically, the center OA of the opening of the insertion hole 10A and the thin portion 50B are adjacent to each other in the width direction W.

A thin portion 49A is formed between the insertion hole 10A (which is the example of the first insertion hole) and the insertion hole 10D (which is the example of the fourth insertion hole).

The hole row 37 includes an insertion hole 10E and an insertion hole 10F. The insertion hole 10F is formed to be adjacent to the insertion hole 10E in the longitudinal direction L. A thin portion 50C is formed between the insertion hole 10E and the insertion hole 10F.

The thin portion 50C and the insertion hole 10C are adjacent to each other in the width direction W, and specifically, the thin portion 50C and the center OC of the opening of the insertion hole 10C are adjacent to each other in the width direction W. Further, the thin portion 50B and the insertion hole 10F are adjacent to each other in the width direction W, and specifically, the center OF of the opening of the insertion hole 10F and the thin portion 50B are adjacent to each other in the width direction W. A thin portion 49B is formed between the insertion hole 10C and the insertion hole 10F.

The hole row 38 (which is an example of the third hole row) includes an insertion hole 10G (which is an example of the fifth insertion hole) and an insertion hole 10H (which is an example of the sixth insertion hole). The insertion hole 10H is formed to be adjacent to the insertion hole 10G in the longitudinal direction L. The insertion hole 10H is formed to be adjacent to the insertion hole 10G in the longitudinal direction L. A thin portion 50D (which is an example of the third thin portion) is formed between the insertion hole 10G and the insertion hole 10H.

The thin portion 50D and the insertion hole 10E are formed to be adjacent to each other in the width direction W. Specifically, the thin portion 50D and the center OE of the opening of the insertion hole 10E are adjacent to each other in the width direction W.

Further, the thin portion 50C and the insertion hole 10H are formed to be adjacent to each other in the width direction W, and specifically, the thin portion 50C and the center OH of the insertion hole 10H are adjacent to each other in the width direction W. A thin portion 49C is formed between the insertion hole 10H and the insertion hole 10E.

As described above, in the holder 2, a plurality of thin portions 50A, 50B, 50C, 50D and thin portions 49A, 49B, 49C are formed by a plurality of insertion holes 10, and each of thin portions 50A, 50B, 50C, 50D, 49A, 49B, 49C is thin in thickness. For example, the distance between the opening edge portion of the insertion hole 10A and the long side surface 30 is taken as the length L10, and the distance between the opening of the insertion hole 10G and the long side surface 31 is taken as the length L11. In this case, the thickness of each of the thin portions 50A, 50B, 50C, 50D and the thickness of each of the thin portions 49A, 49B, 49C are smaller than the lengths L10, L11.

In FIG. 4, the virtual breaking line L1 is a virtual straight line passing through the thin portion 50A and the thin portion 50B. In the embodiment, the virtual breaking line L1 passes through the thin portions 50A, 50B, 50C, 50D and the thin portions 49A, 49B, 49C.

Returning to FIG. 3, a frangible or fragile portion 51 is formed on the long side surface 30 of the holder 2, and a frangible or fragile portion 52 is formed on the long side surface 31. The fragile portion 52 is formed at the center of the long side surface 31 in the longitudinal direction L. The fragile portion 51 is positioned closer to the short side surface 32 than the center of the long side surface 30 in the longitudinal direction L.

In FIG. 4, the fragile portion 51 is formed at a position adjacent to the thin portion 50A in the width direction W, and the fragile portion 52 is formed at a position adjacent to the thin portion 50D in the width direction W.

Figure 5:
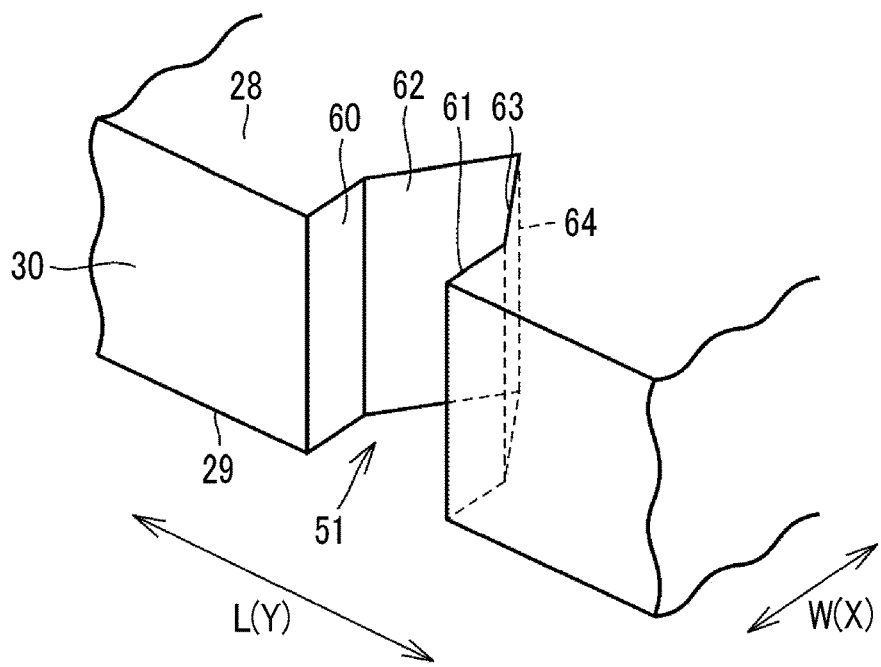
FIG. 5 is a perspective view of a fragile portion and a configuration around the fragile portion.

FIG. 5 is a perspective view of the fragile portion 51 and a configuration around the fragile portion 51. In the embodiment, the fragile portion 51 is a cutout portion formed in the long side surface 30. The fragile portion 51 is formed to extend from the top surface 28 of the holder 2 to the bottom surface 29.

The inner surface of the fragile portion 51 includes inner side surfaces 60, 61 and inclined surfaces 62, 63. The inner side surface 60 and the inner side surface 61 extends from the long side surface 30 in the width direction W, and are arranged at an interval in the longitudinal direction L. The inclined surface 62 is connected to the inner side surface 60, and the inclined surface 63 is connected to the inner side surface 61. The inclined surface 62 and the inclined surface 63 are formed to approach each other as they become distant from the long side surface 30. At a distal end of the fragile portion 52, an apex side 64 is formed.

Figure 6:
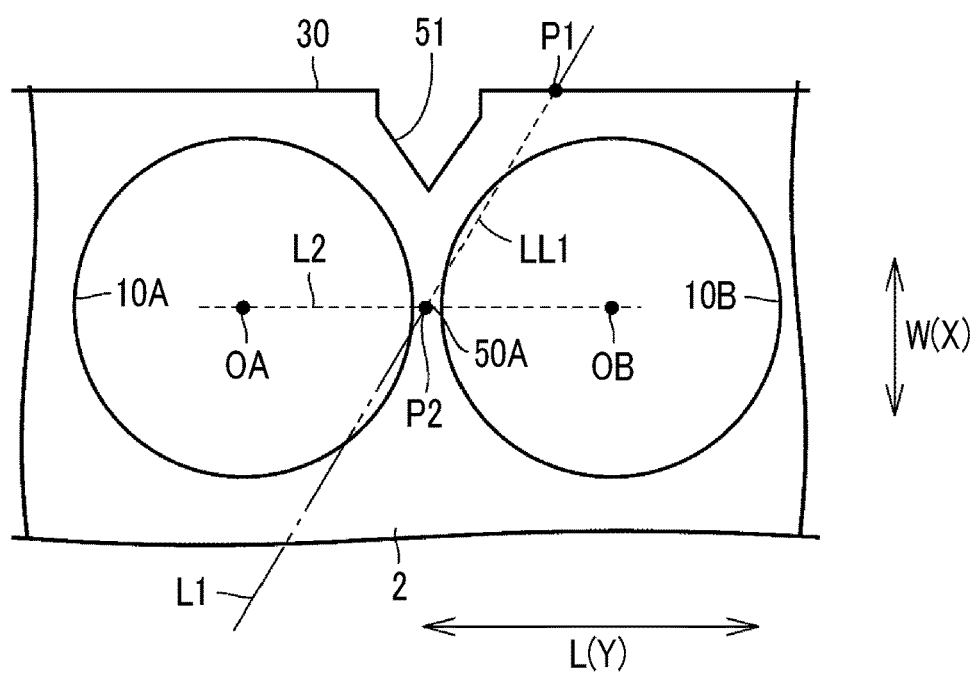
FIG. 6 is a plan view of the fragile portion and the configuration around the fragile portion in FIG. 5.

FIG. 6 is a plan view of the fragile portion 51 and the configuration around the fragile portion 51. The thin portion 50A is the thinnest portion between the insertion hole 10A and the insertion hole 10B. In Embodiment 1, the thin portion 50A is positioned on a virtual line L2 passing through the center OA of the insertion hole 10A and the center OB of the insertion hole 10B.

A portion P1 on the virtual breaking line L1 (which is an example of the first portion) is positioned on the long side surface 30, a portion P2 on the virtual breaking line L1

(which is an example of the second portion) is positioned in the thin portion 50A. The virtual line segment LL1 in FIG. 6 is a line segment of the virtual breaking line L1 between the portion P1 and the portion P2.

Figure 7:
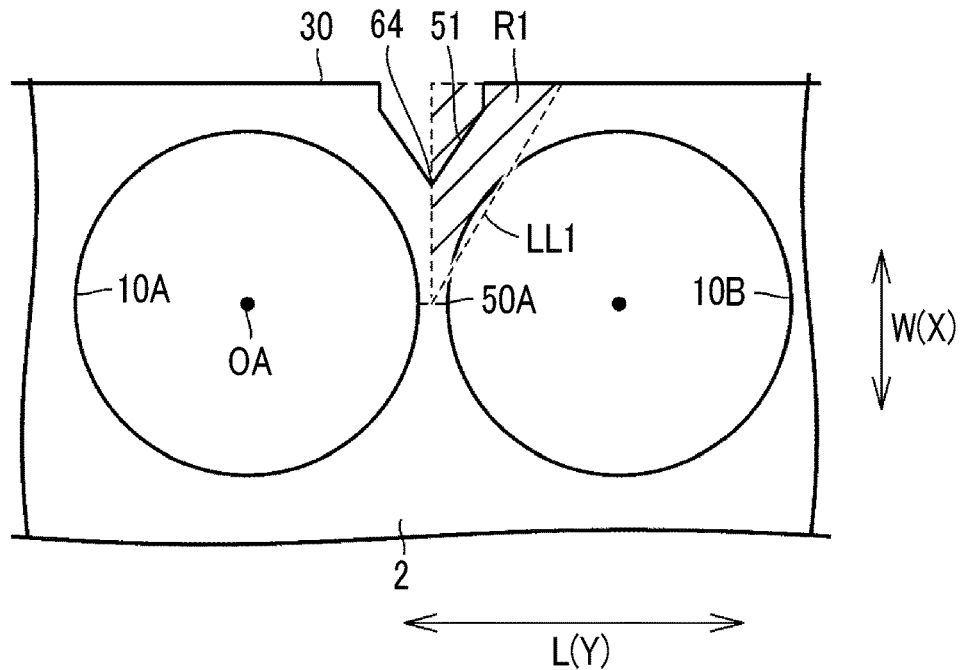
FIG. 7 is a plan view of a disposition relationship between a virtual line segment and the fragile portion in FIG. 6.

FIG. 7 is a plan view of a disposition relationship between the virtual line segment LL1 and the fragile portion 51. In FIG. 7, a region R1 is a portion of the holder 2 positioned close to the long side surface 30 with respect to the virtual line segment LL1.

When the fragile portion 51 is positioned in the vicinity of the virtual breaking line L1, at least a part of the fragile portion 51 is positioned within the region R1. In the example illustrated in FIG. 7, substantially half of the fragile portion 51 is positioned within the region R1. The apex side 64 of the fragile portion 51 is positioned within the region R1.

Figure 8:
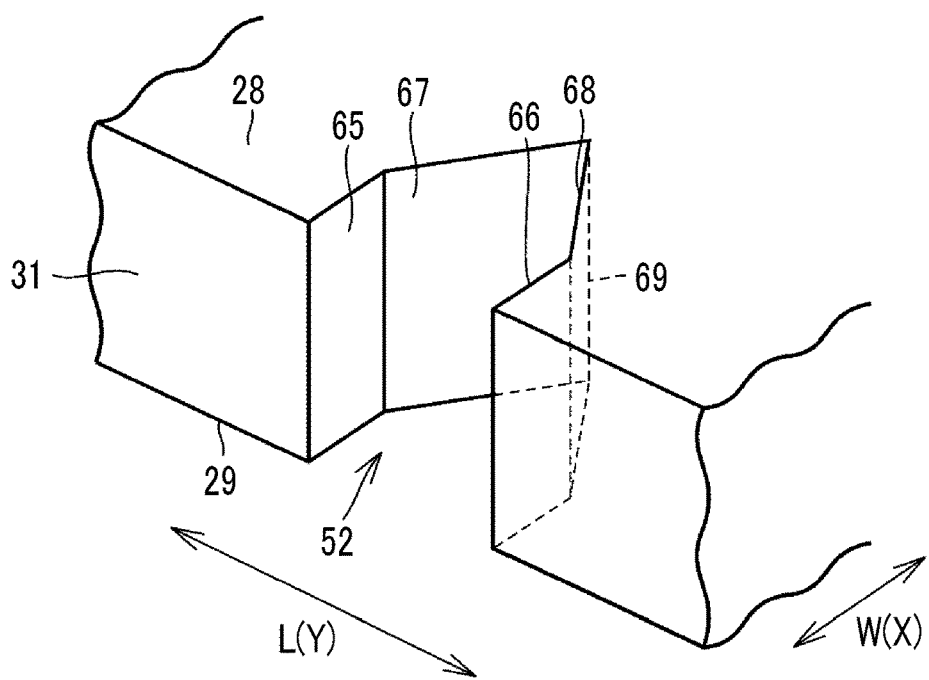
FIG. 8 is another perspective view of a fragile portion and a configuration around the fragile portion.

FIG. 8 is another perspective view of the fragile portion 52 and a configuration around the fragile portion 52. In the embodiment, the fragile portion 52 is a cutout portion formed on the long side surface 31. The fragile portion 52 is formed to extend from the top surface 28 of the holder 2 to the bottom surface 29.

The inner surface of the fragile portion 52 includes inner side surfaces 65, 66 and inclined surfaces 67, 68. The inner side surface 65 and the inner side surface 66 extend from the long side surface 31 in the width direction W, and the inner side surface 65 and the inner side surface 66 are arranged in the longitudinal direction L with a space therebetween.

The inclined surface 67 is connected to the inner side surface 65, and the inclined surface 68 is connected to the inner side surface 66. The inclined surface 67 and the inclined surface 68 are formed to approach each other as they become distant from the long side surface 31. At a distal end of the fragile portion 52, an apex side 69 is formed.

Figure 9:
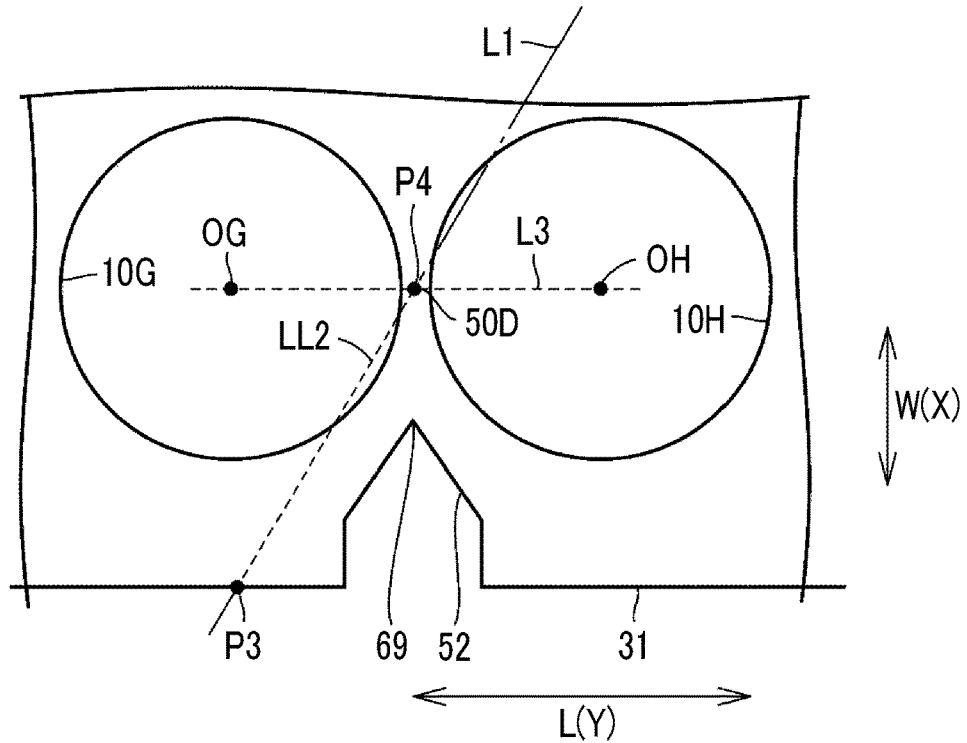
FIG. 9 is a plan view of the fragile portion and the configuration around the fragile portion in FIG. 8.

FIG. 9 is a plan view of the fragile portion 52 and the configuration around the fragile portion 52. The thin portion 50D is the thinnest portion between the insertion hole 10G and the insertion hole 10H. The thin portion 50D is positioned on a virtual line L3 passing through the center OG of the insertion hole 10G and the center OH of the insertion hole 10H.

A portion P3 (which is an example of the third portion) of the virtual breaking line L1 is positioned on the long side surface 31, and a portion P4 (which is an example of the fourth portion) is positioned in the thin portion 50D. The virtual line segment LL2 illustrated in FIG. 9 is a line segment positioned between the portion P3 and the portion P4.

Figure 10:
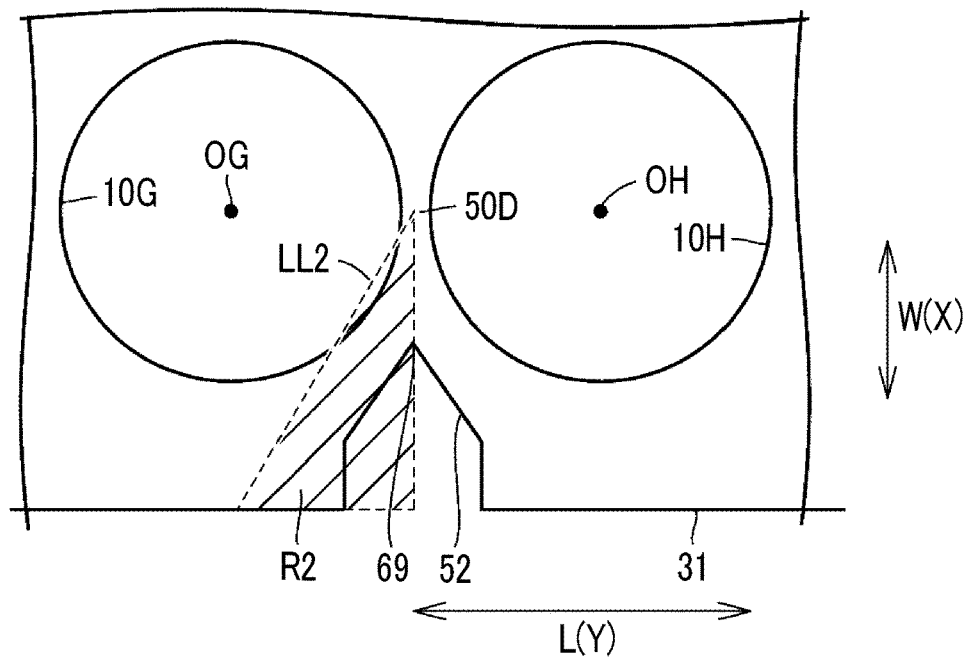
FIG. 10 is a plan view of a disposition relationship between a virtual line segment and the fragile portion in FIG. 9.

FIG. 10 is a plan view of a disposition relationship between a virtual line segment LL2 and the fragile portion 52. A region R2 illustrated in FIG. 10 is a portion positioned closer to the long side surface 31 with respect to the virtual line segment LL2.

When the fragile portion 52 is positioned in the vicinity of the virtual breaking line L1, at least a part of the fragile portion 52 is positioned within the region R2. In the example illustrated in FIG. 10, the apex side 69 is formed at a position adjacent to the thin portion 50D in the width direction W.

In the battery pack 200 configured as described above, a large load may be applied from the outside in some cases.

Figure 11:
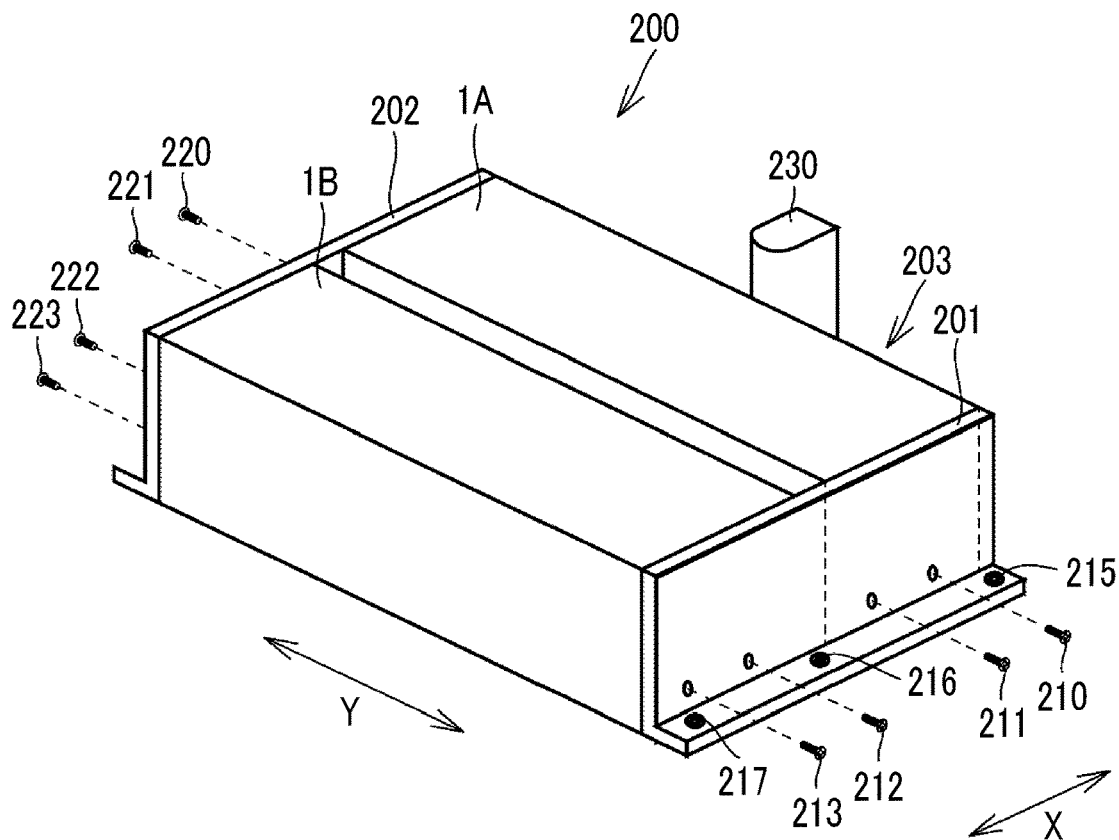
FIG. 11 is a perspective view of a state in which a load is applied to an outer surface of the battery pack from a crushing element.
Figure 12:
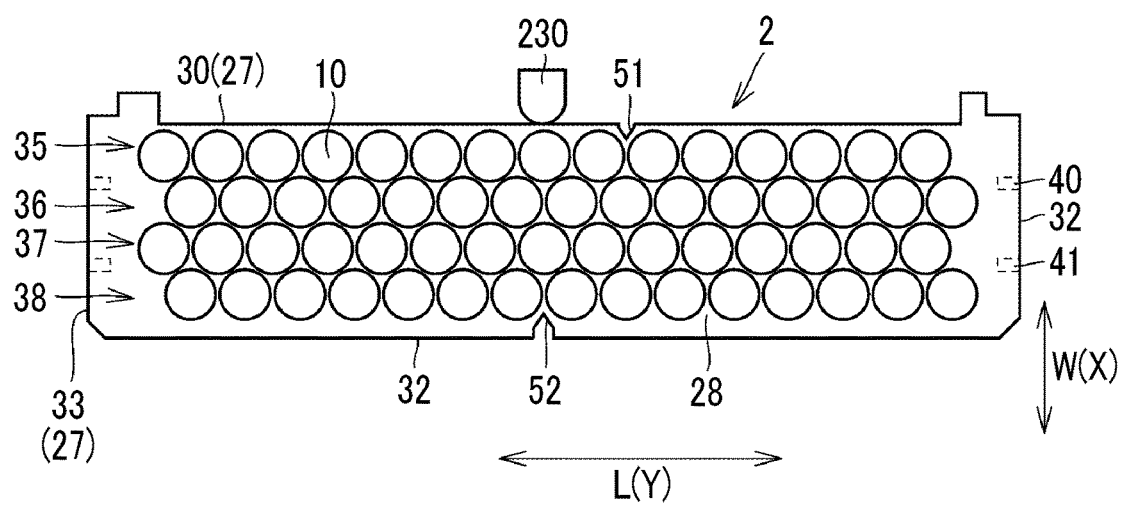
FIG. 12 is a plan view of a state in which a load of an external force is applied from the crushing element to the holder.

FIG. 11 is a perspective view of a state in which a load is applied to an outer surface 203 of the battery pack 200 from a crushing element 230. As illustrated in FIG. 12, in this state, the crushing element 230 applies a load to the holder 2. FIG. 12 is a plan view of a state in which a load of an external force is applied from the crushing element 230 to the holder 2.

In the example illustrated in FIG. 12, the crushing element 230 is in contact with the center of the long side surface 30 in the longitudinal direction L. At this time, the holder 2 is fixed at the short side surface 32 and the short side surface 33, and the holder 2 tend to deform such that the center in the longitudinal direction L is bent, and internal stress is generated in the holder 2.

Figure 13:
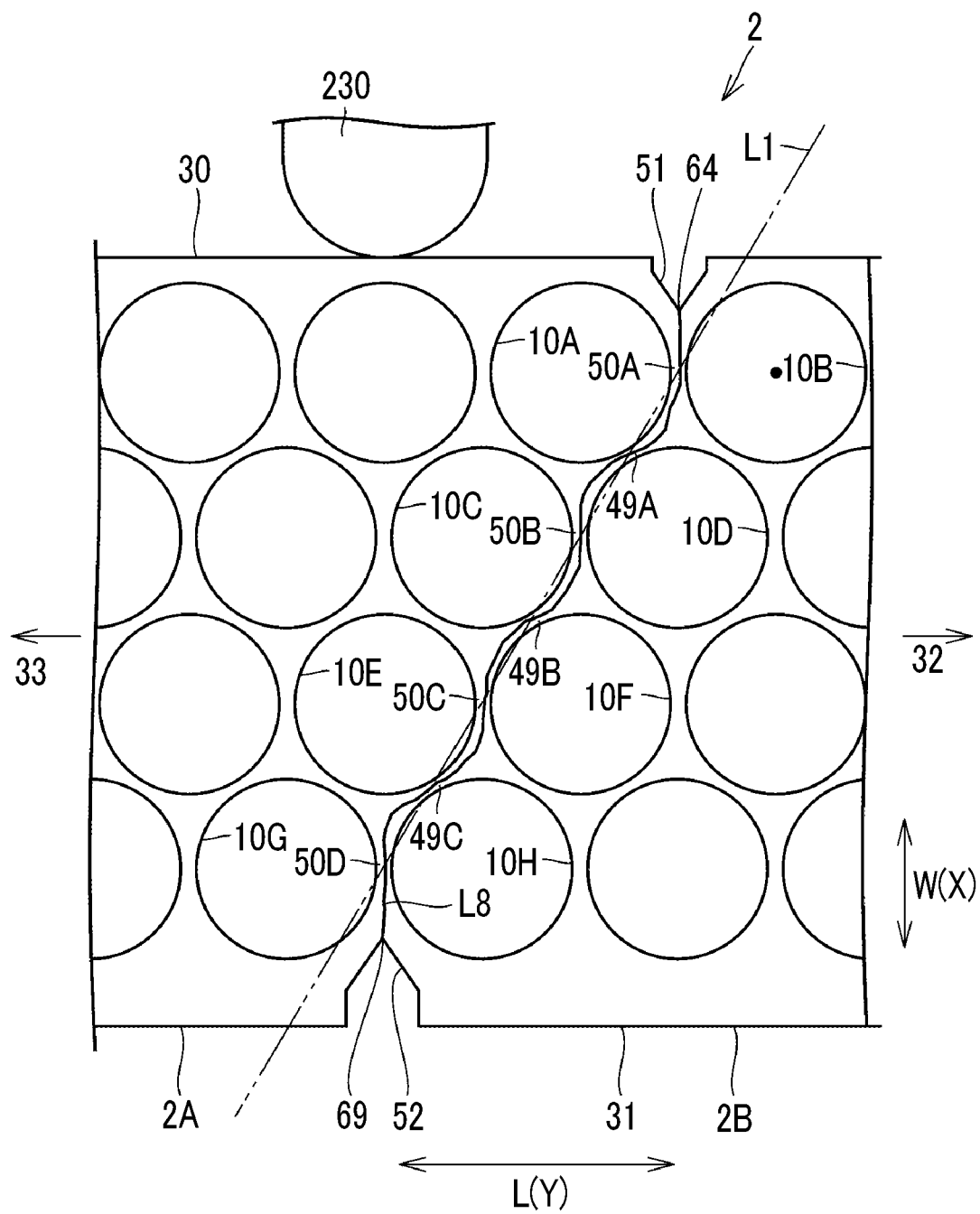
FIG. 13 is an enlarged plan view of a part of the holder in the state illustrated in FIG. 12.

FIG. 13 is an enlarged plan view of a part of the holder 2 in the state illustrated in FIG. 12. The apex side 64 is positioned at the distal end of the fragile portion 51 which is a cutout portion, and stress is likely to concentrate on the apex side 64 by the load from the crushing element 230. For this reason, a crack develops from the apex side 64. The apex side 64 is formed within the region R2 illustrated in FIG. 7, and the crack developing from the apex side 64 tends to reach the virtual breaking line L1.

In particular, since the apex side 64 is formed to be adjacent to the thin portion 50A in the width direction W, the crack developing from the apex side 69 tends to reach the thin portion 50A.

Even in the fragile portion 52, by the load from the crushing element 230, stress is likely to concentrate on the apex side 69 of the fragile portion 52, and the crack from the apex side 69 develops. As illustrated in FIG. 10, the fragile portion 52 is positioned within a region R4, and the fragile portion 52 is positioned in the vicinity of the virtual breaking line L1. Therefore, a crack developing from the fragile portion 52 tends to reach the virtual breaking line L1.

In particular, since the fragile portion 52 is formed at a position facing the contact position of the crushing element 230 with the long side surface 30, a load tends to be applied to the fragile portion 52 so as to spread equally in the longitudinal direction L. As a result, the crack developing from the fragile portion 52 tends to develop in the width direction W and is likely to reach the thin portion 50D.

As described above, when a crack developing from each of the fragile portions 51, 52 reaches the virtual breaking line L1, the rigidity of a portion of the holder 2 through which the virtual breaking line L1 passes becomes lowered, and it is likely that the crack develops or breakage is generated along the virtual breaking line L1.

Specifically, when the crack from the fragile portion 51 reaches the thin portion 50A and the crack from the fragile portion 52 reaches the thin portion 50D, the holder 2 is in a state of being connected by the thin portions 49A, 50B, 49B, 50C, 49C and is in a state of being connected with a small area.

As a result, stress tends to concentrate on the thin portions 49A, 50B, 49B, 50C, 49C, cracks are generated in the thin portions 49A, 50B, 49B, 50C, 49C and the holder 2 is likely to be broken.

As described above, in the embodiment, it is possible to form the breaking line L8 to pass through the thin portions 50A, 49A, 50B, 49B, 50C, 49C, 50D, and it is possible to suppress passage of the breaking line L8 to pass through the insertion hole 10.

When the holder 2 is broken by the breaking line L8, the holder 2 is split into the holder piece 2A and the holder piece 2B.

Even after the holder 2 is split into the holder pieces 2A, 2B, when the crushing element 230 further presses the holder 2, the holder piece 2A moves relative to the holder piece 2B along the breaking line L8.

As the breaking line L8 goes from the long side surface 30 to the long side surface 31, the breaking line L8 runs in a direction from the short side surface 32 to the short side surface 33.

Figure 14:
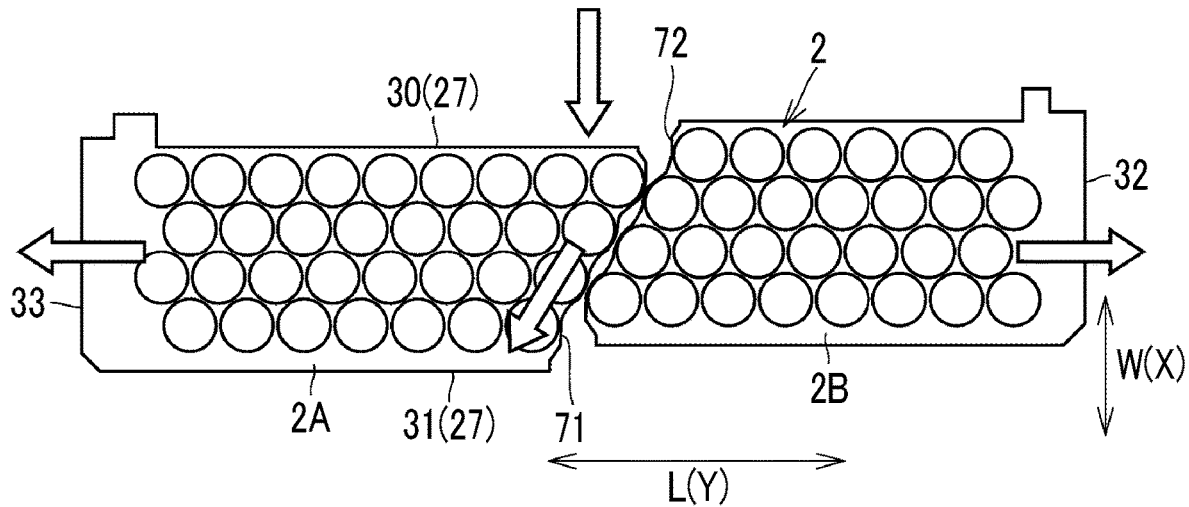
FIG. 14 is a plan view of a state in which one holder piece is moved relative to the other holder piece.

FIG. 14 is a plan view of a state in which the holder piece 2A is moved relative to the holder piece 2B.

As the holder 2 is split by the breaking line L8, a breaking surface 71 is formed in the holder piece 2A, and a breaking surface 72 is formed in the holder piece 2B.

Similarly to the breaking line L8, as the breaking surfaces 71, 72 go from the long side surface 30 to the long side surface 31, the breaking surfaces 71, 72 also extends in the direction from the short side surface 32 to the short side surface 33.

Therefore, the holder piece 2A and the holder piece 2B move along the breaking surfaces 71, 72, and the holder pieces 2A, 2B move in the longitudinal direction L and the width direction W, respectively.

Figure 15:
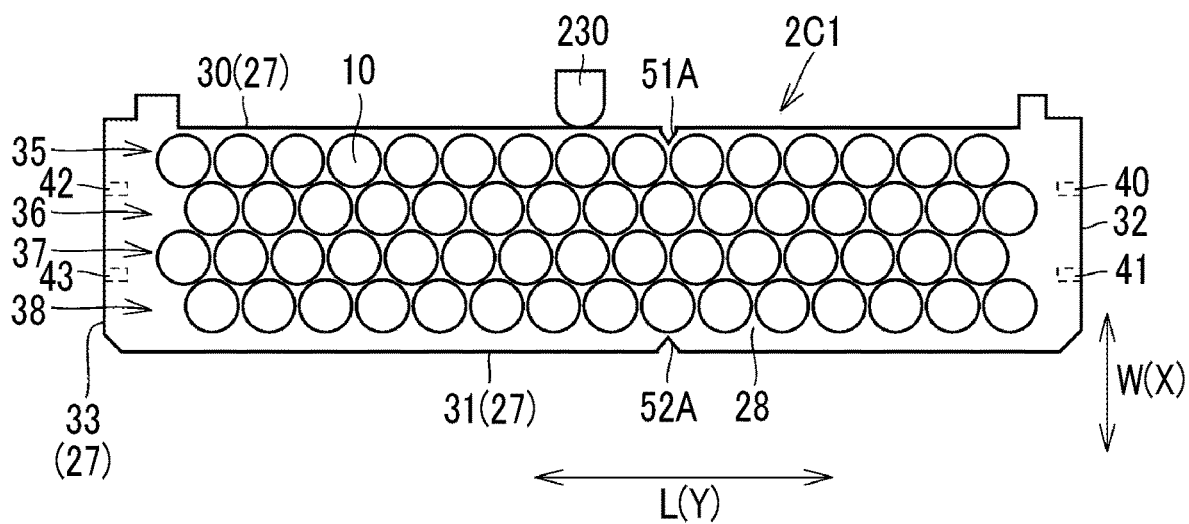
FIG. 15 is a plan view of a holder according to a comparative example.

FIG. 15 is a plan view of a holder 2C1 according to a comparative example. A frangible or fragile portion 51A is formed on a long side surface 30 of the holder 2C1, and a frangible or fragile portion 52A is formed on a long side surface 31. The fragile portion 51A and the fragile portion 52A are opposite to each other in the width direction W. A plurality of insertion holes 10 is positioned between the fragile portion 51A and the fragile portion 52A.

The fragile portions 51A, 52A are formed closer to the short side surface 32 than the centers of the long side surfaces 30, 31 in the longitudinal direction L.

Figure 16:
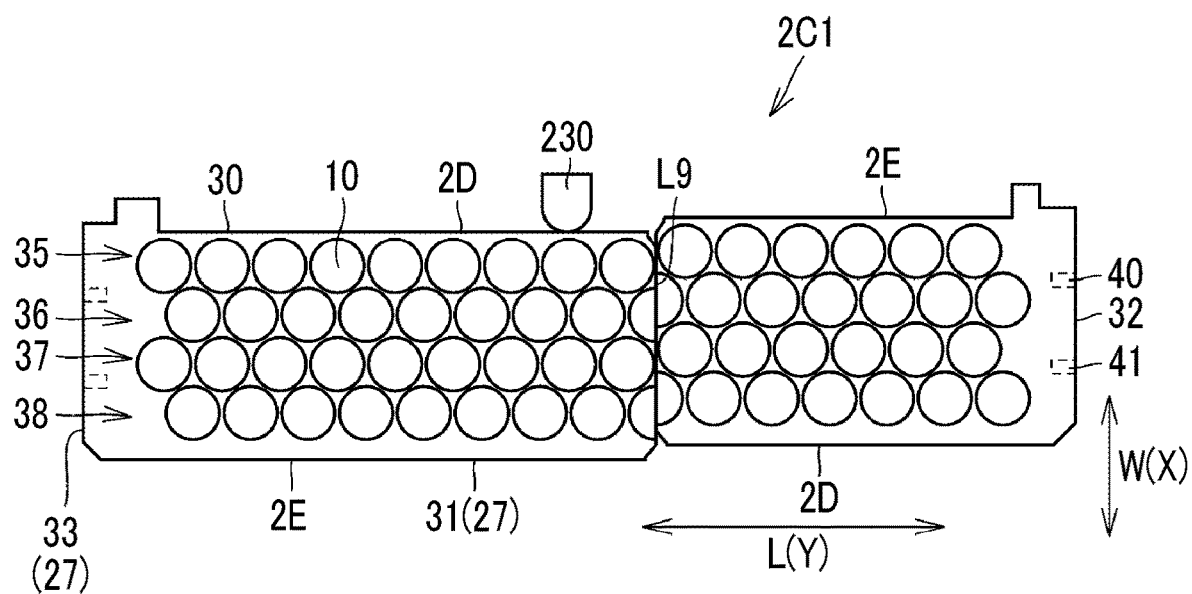
FIG. 16 is a plan view of a state in which the holder is pressed by a crushing element.

FIG. 16 is a plan view of a state in which the holder 2C1 is pressed by a crushing element 230. Since a plurality of insertion holes 10 is positioned between the fragile portion 51A and the fragile portion 52A, when the crushing element 230 presses the center of the long side surface 30, the crack developing from the fragile portion 51A is likely to reach the insertion holes 10. Further, the crack developing from the fragile portion 52A is likely to reach the insertion holes 10.

As a result, the breaking line L9 is likely to pass through the insertion holes 10 positioned between the fragile portion 51A and the fragile portion 52A. The holder 2 is split into a holder piece 2D and a holder piece 2E by the breaking line L9. Then, furthermore, the crushing element 230 presses the holder piece 2E, which, in turn, moves relative to the holder piece 2D in the width direction W.

In this case, in the insertion hole 10 positioned between the fragile portion 51A and the fragile portion 52A, there is a possibility that the cylindrical battery inserted into the insertion hole 10 is pressed by the holder pieces 2D, 2E and damaged.

On the other hand, in the holder 2 according to the embodiment, as illustrated in FIG. 13, passage of the breaking line L8 through the insertion hole 10 is suppressed, and thus occurrence of damage as described above is suppressed.

Furthermore, in the holder 2C1 according to the comparative example, the holder piece 2E moves with respect to the holder piece 2D just in the width direction W.

On the other hand, as illustrated in FIG. 14, in the holder 2 according to the embodiment, the holder pieces 2A, 2B are displaced in the longitudinal direction L.

That is, since the holder 2 according to the embodiment is consumed for deformation in the longitudinal direction L when the load from the crushing element 230 is the same, the displacement amount of the holder piece 2A of the holder 2 in the width direction W can be suppressed so as to be smaller than the displacement amount of the holder piece 2D of the comparative example in the width direction W.

Therefore, contact of the holder piece 2A with the power storage device 1B adjacent to the power storage device 1A can be suppressed, and thus damage to the power storage device 1B can be suppressed.

In the embodiment, have been described with an example in which the fragile portion 51 and the fragile portion 52 are disposed in the vicinity of the virtual breaking line L1 has been described, but the fragile portion 51 and the fragile portion 52 may be formed at positions through which the virtual breaking line L1 passes.

Figure 17:
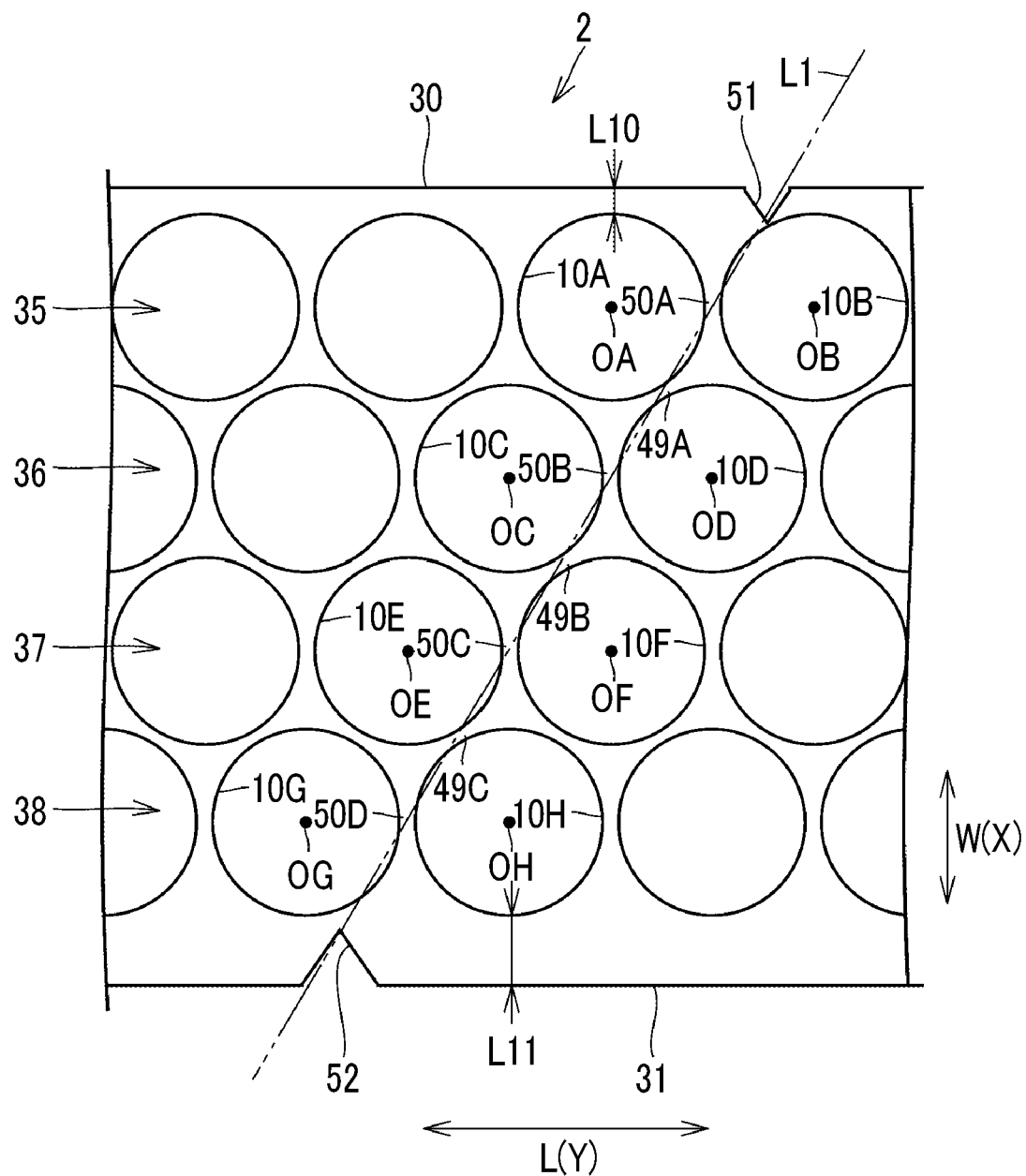
FIG. 17 is a plan view of a holder in which fragile portions are formed at positions through which a virtual breaking line passes.

FIG. 17 is a plan view of a holder in which the fragile portions 51, 52 are formed at positions through which a virtual breaking line L1 passes.

In the holder 2, the fragile portion 51 is formed at a position overlapping with the virtual breaking line L1, the fragile portion 52 is also formed at a position overlapping with the virtual breaking line L1.

Since the fragile portions 51, 52 are formed, the sectional area of the holder 2 decreased at the position through which the virtual breaking line L1 passes.

Therefore, when a load is applied from a crushing element 230 to the holder 2, stress tends to concentrate along the virtual breaking line L1, and thus the holder 2 is broken along the virtual breaking line L1. Specifically, the breakage of the breaking line occurs so as to pass through thin portions 50A, 49A, 50B, 49B, 50C, 49C, 50D. In this way, it is possible to obtain the same effect as the embodiment described above.

One of the fragile portion 51 and the fragile portion 52 may be formed at a position overlapping with the virtual breaking line L1 and the other may be formed in the vicinity of the virtual breaking line L1. The configuration of the power storage device 1A has been described above in detail, and the power storage device 1B is configured similarly to that of the power storage device 1A.

Embodiment 2

A power storage device 1C according to Embodiment 2 will be described with reference to FIG. 18 and the like. The configuration of the power storage device 1C is substantially the same as that of the power storage device 1A except for the holder.

Figure 18:
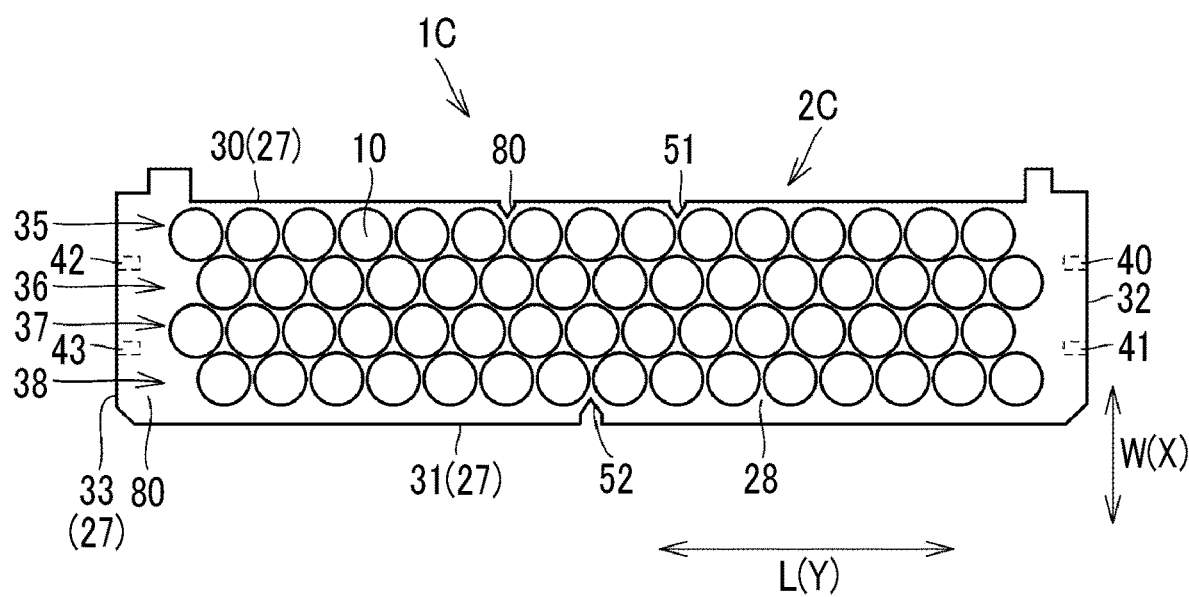
FIG. 18 is a plan view of a holder of a power storage device.

FIG. 18 is a plan view of a holder 2C of the power storage device 1C. A frangible or fragile portion 51 and a frangible or fragile portion 80 are formed on a long side surface 30 of the holder 2C, and a frangible or fragile portion 52 is formed on a long side surface 31.

Figure 19:
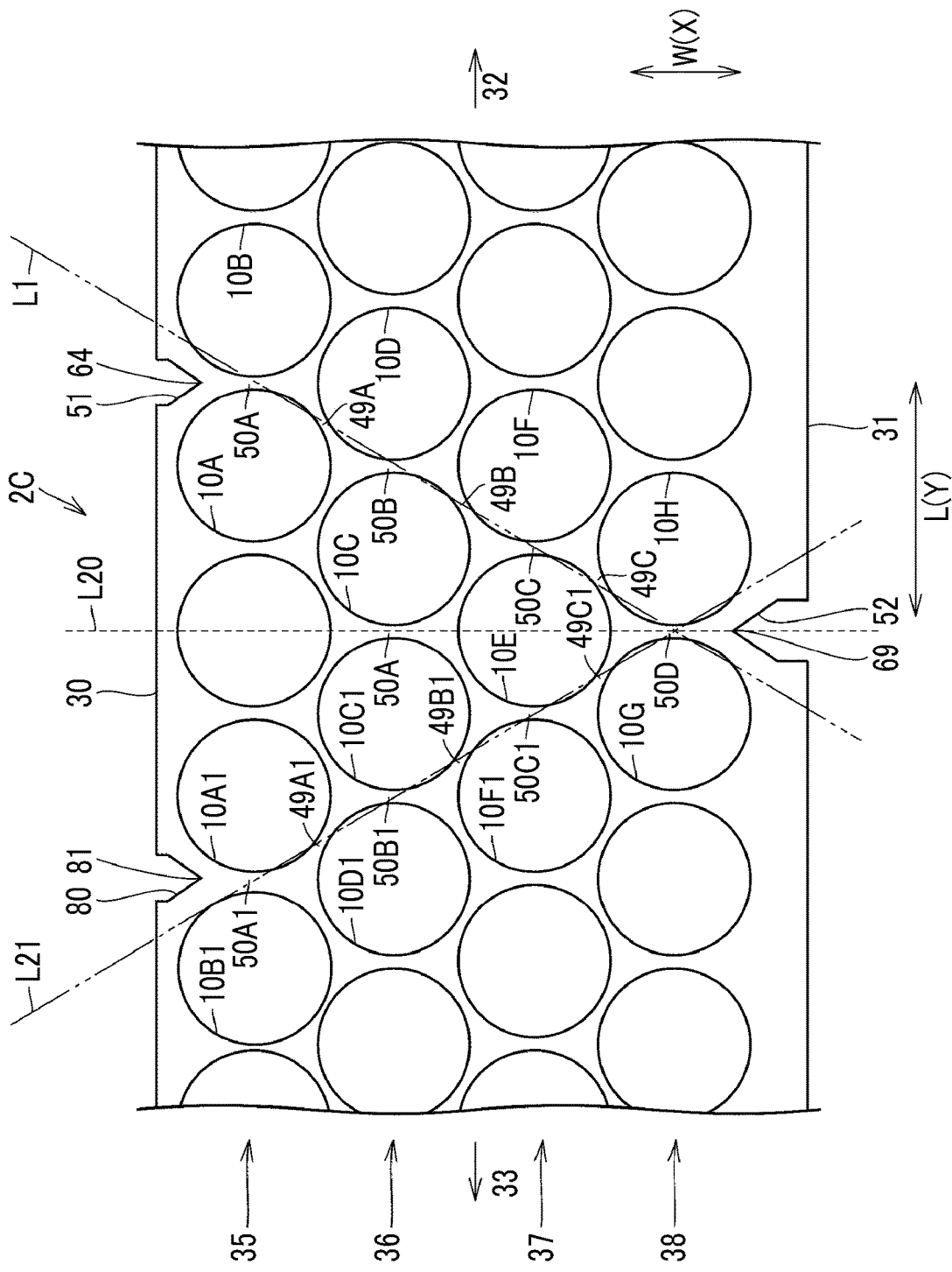
FIG. 19 is a plan view of fragile portions and configurations around the fragile portions.

FIG. 19 is a plan view of fragile portions 51, 52, 80 and the configuration around the fragile portions. Here, a symmetrical virtual line L20 is a virtual straight line that passes through the apex side 69 of the fragile portion 52 and extends in the width direction W.

Even in Embodiment 2, each of hole rows 35, 36, 37, 38 includes a plurality of insertion holes 10 arranged at equal intervals in the longitudinal direction L.

On the other hand, in Embodiment 2, the insertion holes 10 other than the insertion holes 10A to 10H described in Embodiment 1 will be described as the insertion holes 10 associated with the fragile portion 80.

The hole row 35 includes an insertion hole 10A1 (which is an example of the seventh insertion hole) formed at a position symmetrical to the insertion hole 10A with respect to the symmetrical virtual line L20. Further, the hole row 35 includes an insertion hole 10B1 (which is an example of the eighth insertion hole) formed at a position symmetrical to the insertion hole 10B with respect to the symmetrical virtual line L20. A thin portion 50A1 (which is an example of the fourth thin portion) is formed between the insertion hole 10A1 and the insertion hole 10B1.

The hole row 36 includes an insertion hole 10C1 (which is an example of the seventh insertion hole) formed at a position symmetrical to the insertion hole 10C with respect to the symmetrical virtual line L20. Further, the hole row 36 includes an insertion hole 10D1 (which is an example of the eighth insertion hole) formed at a position symmetrical to the insertion hole 10D with respect to the symmetrical virtual line L20. A thin portion 50B1 (which is an example of the fifth thin portion) is formed between the insertion hole 10C1 and the insertion hole 10D1.

The hole row 37 includes an insertion hole 10F1 formed at a position symmetrical to the insertion hole 10F with respect to the symmetrical virtual line L20. A thin portion 50C1 is formed between the insertion hole 10E and the insertion hole 10F1.

Here, the virtual breaking line L21 (which is an example of another virtual breaking line) is a virtual straight line passing through thin portions 50A1, 49A1, 50B1, 49B1, 50C1, 49C1, 50D.

Figure 20:
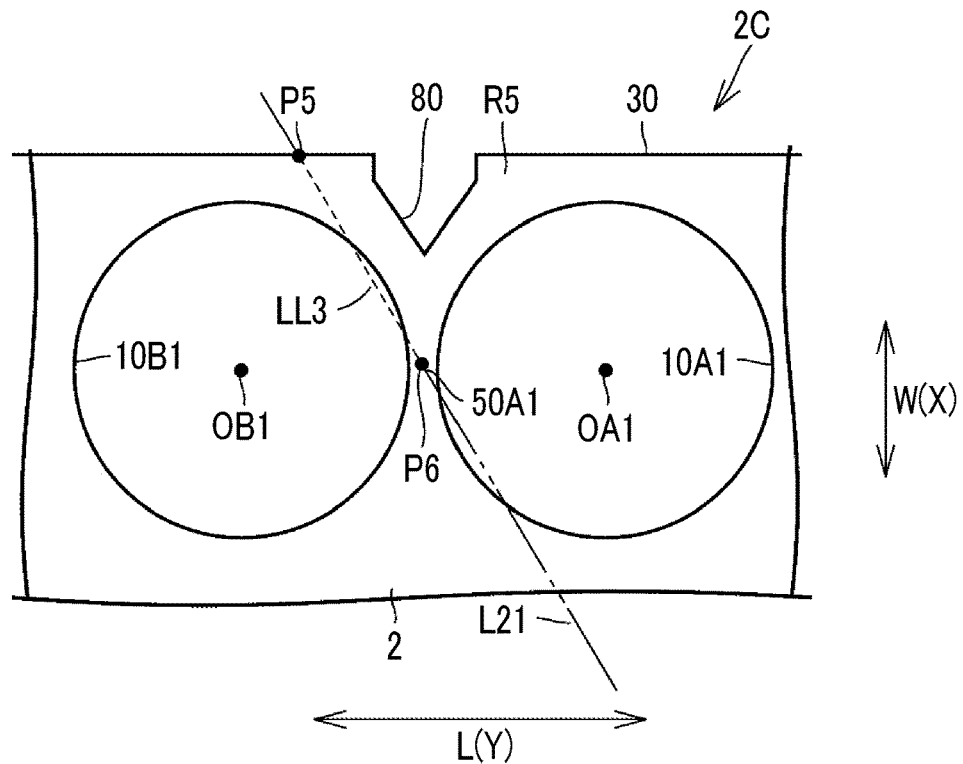
FIG. 20 is a plan view of a fragile portion and a configuration around the fragile portion illustrated in FIG. 19.

FIG. 20 is a plan view of the fragile portion 80 and the configuration around the fragile portion 80. The part P5 of a virtual breaking line L21 is positioned on the long side surface 30, the part P6 is positioned in a thin portion 50A1.

The virtual line segment LL3 is a line segment positioned between the part P1 and the part P2 of the virtual breaking line L21.

Figure 21:
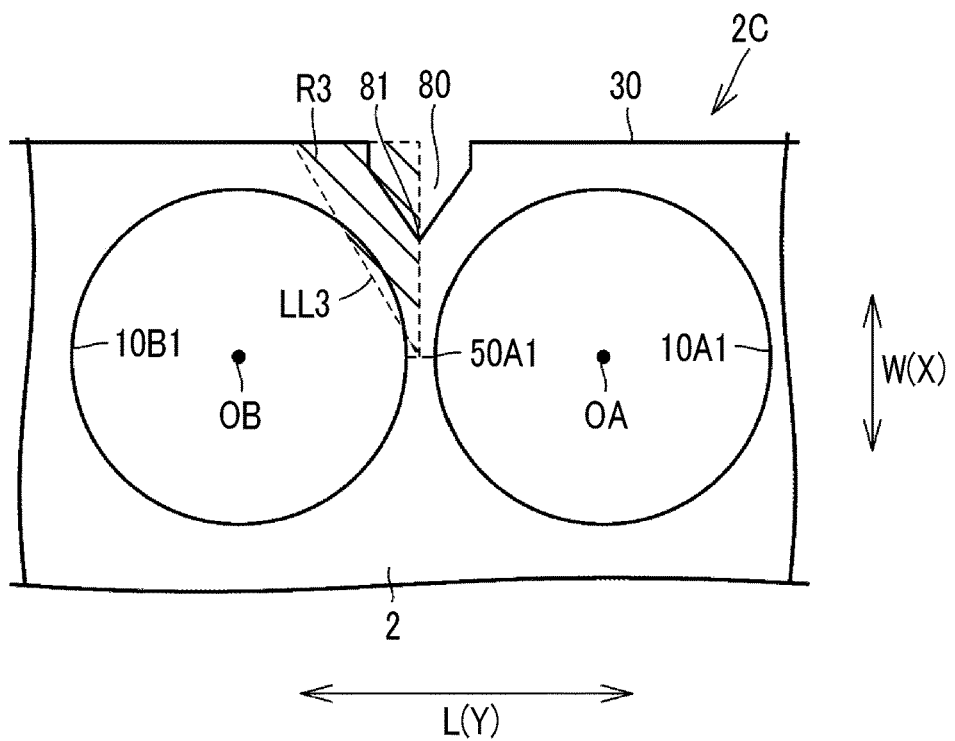
FIG. 21 is a plan view of a disposition relationship between a virtual line segment and the fragile portion illustrated in FIG. 20.

FIG. 21 is a plan view of a disposition relationship between the virtual line segment LL3 and the fragile portion 80. In FIG. 21, the region R3 is a region of the holder 2 closer to the virtual line segment LL3 with respect to the long side surface 30.

"The fragile portion 80 is positioned in the vicinity of the virtual breaking line L21" means that at least a part of the fragile portion 80 is positioned within the region R3.

In Embodiment 2, the distal end of the fragile portion 80 is formed to be tapered as it becomes distant from the long side surface 30. At the distal end of the fragile portion 80, the apex side 81 is formed, which is similar to the apex side 64 of the fragile portion 51. The apex side 81 is adjacent to the thin portion 50A1 in the width direction W.

Figure 22:
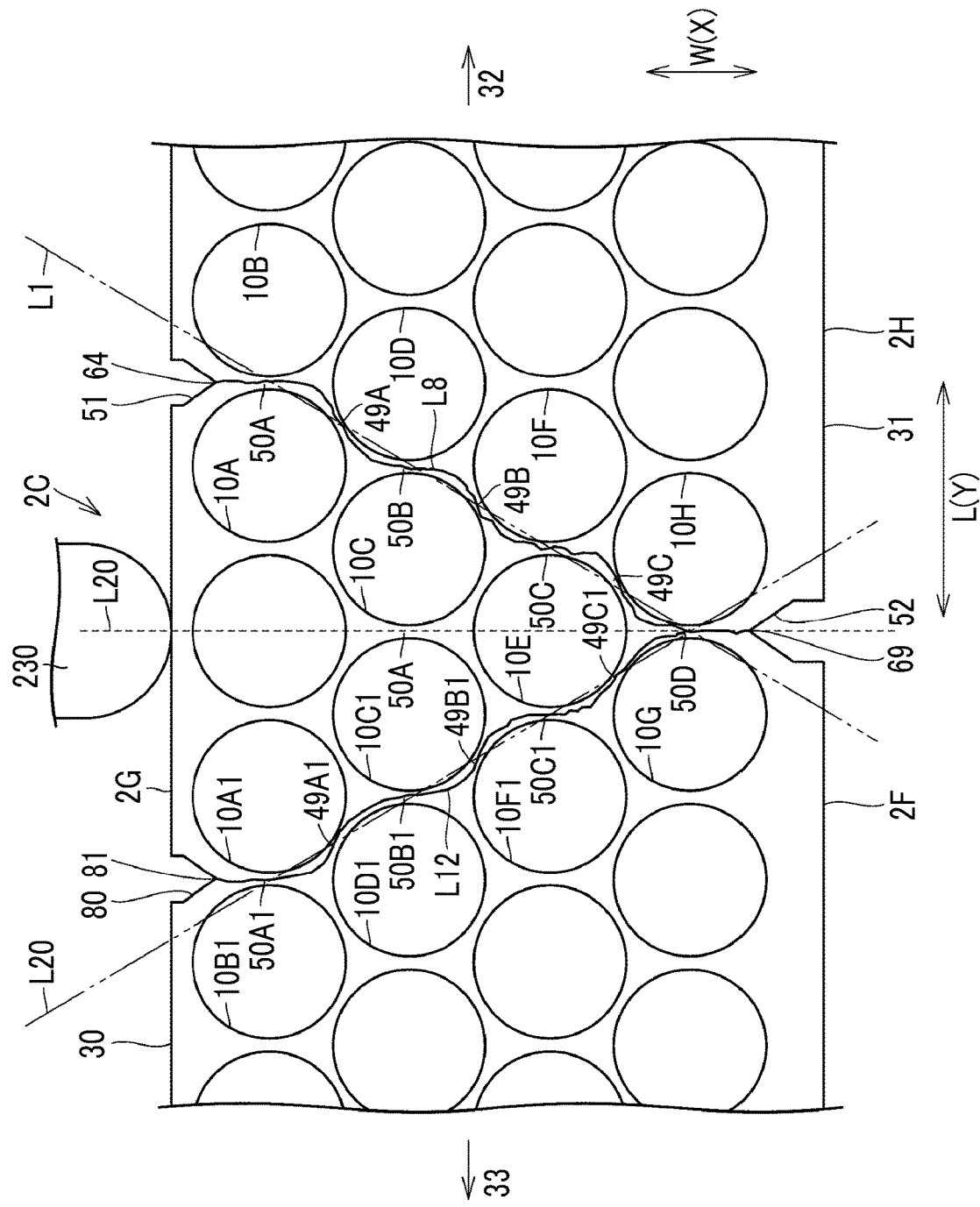
FIG. 22 is a plan view when a crushing element presses the center of a long side surface in a longitudinal direction.

A case in which an external force is applied to the holder 2C configured as described above will be described. FIG. 22 is a plan view when the crushing element 230 presses the center of the long side surface 30 in the longitudinal direction L.

Here, when the crushing element 230 presses the long side surface 30, cracks develop from the apex sides 64, 69, 81. Since the apex side 81 is provided to be adjacent to the thin portion 50A1, the crack developing from the apex side 81 tends to reach the thin portion 50A1. Further, the crack developing from the apex side 69 of the fragile portion 52 tends to reach the thin portion 50D.

Therefore, the holder 2C is in a state of being connected mainly by the thin portions 49A1, 50B1, 49B1, 50C1, 49C1, 50D, and stress tends to concentrate on each of the thin portions 49A1, 50131, 49B1, 50C1, 49C1, 50D. As a result, the breaking line L12 is formed to pass through the thin portions 50A1, 49A1, 50B1, 49B1, 50C1, 49C1, 50D. The breaking line L12 is inclined such that, as the breaking line L12 goes from the long side surface 30 to the long side surface 31, the breaking line L12 runs toward the short side surface 32 from the short side surface 33.

Even in the embodiment, since the fragile portion 51 and the fragile portion 52 are formed, the breaking line L8 is formed. For this reason, in the holder 2C, it is also possible to suppress passage of the breaking lines L12, L8 through the insertion holes 10.

When the breaking line L8 and the breaking line L12 are formed, the holder 2C is split into holder pieces 2F, 2G, 2H.

Then, when the crushing element 230 further presses the holder piece 2G, the holder pieces 2F, 2G, 2H move relative to each other.

Figure 23:
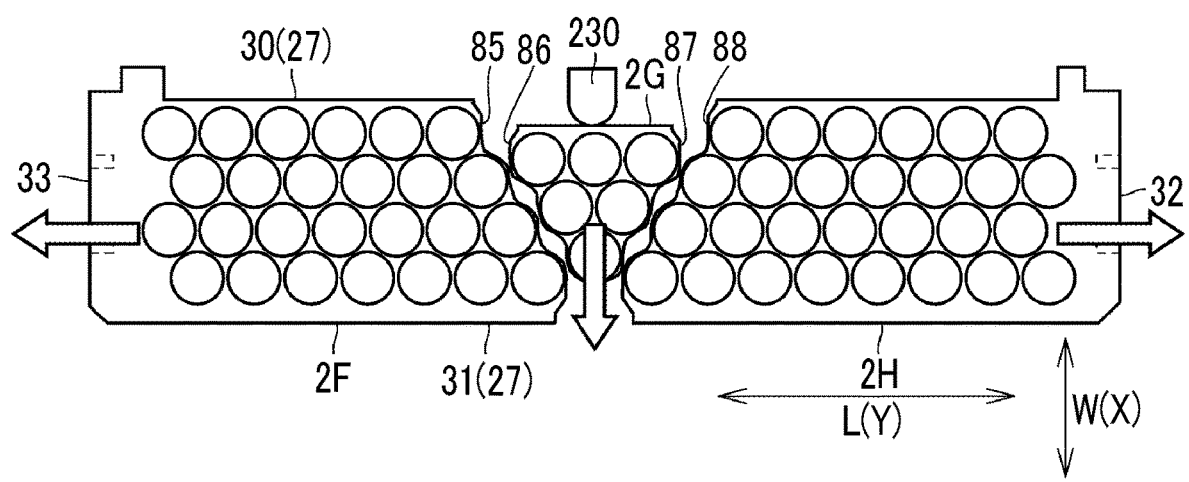
FIG. 23 is a plan view of a state in which a holder piece is further pressed by the crushing element after the holder is broken.

FIG. 23 is a plan view of a state in which the holder piece 2G is further pressed by the crushing element 230 after the holder 2C is broken.

When the holder 2C is broken at breaking lines L12, L8, a breaking surface 85 is formed in the holder piece 2F. In the holder piece 2G, a breaking surface 86 and a breaking surface 87 are formed. Similarly, in the holder piece 2H, a breaking surface 88 is formed.

When the holder piece 2G moves in the width direction W, the holder piece 2F moves along the breaking surface 86. In this case, since the breaking surface 86 is inclined such that, as the breaking surface 86 goes from the long side surface 30 to the long side surface 31, the breaking surface 86 extends in the direction from the short side surface 33 to the short side surface 32, the holder piece 2F moves in the width direction W and the longitudinal direction L. Specifically, as the breaking surface 86 moves in the width direction W, the breaking surface 86 moves in the direction from the short side surface 32 to the short side surface 33.

Similarly, as the holder piece 2H moves in the width direction W, the holder piece 2H moves in a direction from the short side surface 33 to the short side surface 32.

As described above, in the holder 2C, it is also possible to move the holder piece 2F and the holder piece 2H in the longitudinal direction L by the load from the crushing element 230.

As described above, since the load from the crushing element 230 is also consumed for deformation in the longitudinal direction L, it is possible to suppress large deformation of the holder 2C in the load direction (width direction W) of the crushing element 230.

In Embodiment 2, an example in which the fragile portion 80 is formed in the vicinity of the virtual breaking line L21 has been described, but the fragile portion 80 may be formed at any position where the virtual breaking line L21 passes.

In Embodiment 1, 2 described above, an example in which the cutout portion is employed as the fragile portion has been described, but the fragile portion is not limited to the cutout portion, and anything in which, when a load is applied from the outside, stress concentrates and a crack is generated may be used. For example, a through-hole formed in the vicinity of each of the long side surfaces 30, 31 may be used.

The embodiments disclosed above are exemplary in all respects, and should not be considered to limit the disclosure. The scope of the disclosure is defined by the claims, and is intended to cover all equivalents and modifications included within the claims. In addition, numerical values and the like described above are merely exemplary, and the disclosure is not limited to the numerical values and ranges described above.

What is claimed is:

1. A power storage device comprising:
a holder that includes a plurality of hole rows having a plurality of insertion holes and is provided to be longer in a longitudinal direction than in a width direction; and
a unit battery that is inserted into each of the insertion holes, wherein:
the holder includes
a first long side surface and a second long side surface extending in the longitudinal direction and arranged in the width direction, a first frangible portion on the first long side surface, and a second frangible portion on the second long side surface;

the plurality of hole rows includes a first hole row and a second hole row closer to the second long side surface than the first hole row, the first hole row including a first insertion hole and a second insertion hole adjacent to the first insertion hole in the longitudinal direction, the second hole row including a third insertion hole and a fourth insertion hole adjacent to the third insertion hole in the longitudinal direction;

a first portion of the holder positioned between the first insertion hole and the second insertion hole is disposed adjacent to the fourth insertion hole in the width direction;

a second portion of the holder positioned between the third insertion hole and the fourth insertion hole is disposed adjacent to the first insertion hole in the width direction; and when a virtual straight line passing through the first portion and the second portion is taken as a virtual breaking line, the first frangible portion and the second frangible portion are disposed at positions through which the virtual breaking line passes, wherein the insertion holes of each of the hole rows are arranged in the longitudinal direction, each of the hole rows is arranged in the width direction, and the virtual breaking line passes through the portion positioned between the insertion holes in each of the hole rows.

2. The power storage device according to claim 1, wherein:

the virtual breaking line includes a first line portion positioned on the first long side surface and a second line portion positioned in the first portion; and when a line segment of the virtual line positioned between the first line portion and the second line portion is taken as a first virtual line segment and a portion of the holder which is positioned close to the first long side surface with respect to the first virtual line segment is taken as a first region, at least a part of the first frangible portion is positioned in the first region when the first frangible portion is positioned adjacent to the virtual breaking line.

3. The power storage device according to claim 1, wherein:

the plurality of hole rows include a third hole row provided at a position adjacent to the second long side surface;

the third hole row includes a fifth insertion hole and a sixth insertion hole adjacent to the fifth insertion hole in the longitudinal direction;

the virtual breaking line passes through a third portion positioned between the fifth insertion hole and the sixth insertion hole;

the virtual breaking line includes a third line portion positioned on the second long side surface and a fourth line portion positioned in the third portion; and when a line segment of the virtual breaking line positioned between the third line portion and the fourth line portion is taken as a second virtual line segment and a portion of the holder which is positioned close to the second long side surface with respect to the second virtual line segment is taken as a second region, at least a part of the second frangible portion is positioned in the second region when the second frangible portion is positioned adjacent to the virtual breaking line.

4. The power storage device according to claim 1, wherein:

the holder includes a third frangible portion on the first long side surface;

when a virtual line passing through the second frangible portion and extending in the width direction is taken as a symmetrical virtual line, the first hole row includes a seventh insertion hole and an eighth insertion hole provided symmetrically with the first insertion hole and the second insertion hole with respect to the symmetrical virtual line;

a fourth portion is included between the seventh insertion hole and the eighth insertion hole;

the second hole row includes a ninth insertion hole and a tenth insertion hole provided symmetrically with the third insertion hole and the fourth insertion hole with respect to the symmetrical virtual line;

a fifth portion is included between the ninth insertion hole and the tenth insertion hole; and when a virtual straight line passing through the fourth portion and the fifth portion is taken as another virtual breaking line, the third frangible portion is disposed at a position through which the other virtual breaking line passes, or adjacent to the other virtual breaking line.

5. A power storage device comprising:

a holder that includes a plurality of hole rows having a plurality of insertion holes and is provided to be longer in a longitudinal direction than in a width direction; and a unit battery that is inserted into each of the insertion holes, wherein:

the holder includes a first long side surface and a second long side surface extending in the longitudinal direction and arranged in the width direction, a first frangible portion on the first long side surface, and a second frangible portion on the second long side surface;

the plurality of hole rows includes a first hole row and a second hole row closer to the second long side surface than the first hole row, the first hole row including a first insertion hole and a second insertion hole adjacent to the first insertion hole in the longitudinal direction, the second hole row including a third insertion hole and a fourth insertion hole adjacent to the third insertion hole in the longitudinal direction;

a first portion of the holder positioned between the first insertion hole and the second insertion hole is disposed adjacent to the fourth insertion hole in the width direction;

a second portion of the holder positioned between the third insertion hole and the fourth insertion hole is disposed adjacent to the first insertion hole in the width direction;

when a virtual straight line passing through the first portion and the second portion is taken as a virtual breaking line, the first frangible portion and the second frangible portion are disposed at positions through which the virtual breaking line passes or adjacent to the virtual breaking line;

the holder includes a third frangible portion on the first long side surface;

when a virtual line passing through the second frangible portion and extending in the width direction is taken as a symmetrical virtual line, the first hole row includes a seventh insertion hole and an eighth insertion hole provided symmetrically with the first insertion hole and the second insertion hole with respect to the symmetrical virtual line;

a fourth portion is included between the seventh insertion hole and the eighth insertion hole;

the second hole row includes a ninth insertion hole and a tenth insertion hole provided symmetrically with the third insertion hole and the fourth insertion hole with respect to the symmetrical virtual line;

a fifth portion is included between the ninth insertion hole and the tenth insertion hole; and when a virtual straight line passing through the fourth portion and the fifth portion is taken as another virtual breaking line, the third frangible portion is disposed at a position through which the other virtual breaking line passes, or adjacent to the other virtual breaking line.

6. The power storage device according to claim 5, wherein:

the virtual breaking line includes a first line portion positioned on the first long side surface and a second line portion positioned in the first portion; and when a line segment of the virtual breaking line positioned between the first line portion and the second line portion is taken as a first virtual line segment and a portion of the holder which is positioned close to the first long side surface with respect to the first virtual line segment is taken as a first region, at least a part of the first frangible portion is positioned in the first region when the first frangible portion is positioned adjacent to the virtual breaking line.

7. The power storage device according to claim 5, wherein:

the plurality of hole rows include a third hole row provided at a position adjacent to the second long side surface;

the third hole row includes a fifth insertion hole and a sixth insertion hole adjacent to the fifth insertion hole in the longitudinal direction;

the virtual breaking line passes through a third portion positioned between the fifth insertion hole and the sixth insertion hole;

the virtual breaking line includes a third line portion positioned on the second long side surface and a fourth line portion positioned in the third portion; and when a line segment of the virtual breaking line positioned between the third line portion and the fourth line portion is taken as a second virtual line segment and a portion of the holder which is positioned close to the second long side surface with respect to the second virtual line segment is taken as a second region, at least a part of the second frangible portion is positioned in the second region when the second frangible portion is positioned adjacent to the virtual breaking line.

8. The power storage device according to claim 5, wherein:

the insertion holes of each of the hole rows are arranged in the longitudinal direction;

each of the hole rows is arranged in the width direction; and the virtual breaking line passes through the portion positioned between the insertion holes in each of the hole rows.

9. A power storage device comprising:

a holder that includes a plurality of hole rows having a plurality of insertion holes and is provided to be longer in a longitudinal direction than in a width direction; and a unit battery that is inserted into each of the insertion holes, wherein:

the holder includes a first long side surface and a second long side surface extending in the longitudinal direction and arranged in the width direction, a first frangible portion on the first long side surface, and a second frangible portion on the second long side surface;

the plurality of hole rows includes a first hole row and a second hole row closer to the second long side surface than the first hole row, the first hole row including a first insertion hole and a second insertion hole adjacent to the first insertion hole in the longitudinal direction, the second hole row including a third insertion hole and a fourth insertion hole adjacent to the third insertion hole in the longitudinal direction;

a first portion of the holder positioned between the first insertion hole and the second insertion hole is disposed adjacent to the fourth insertion hole in the width direction;

a second portion of the holder positioned between the third insertion hole and the fourth insertion hole is disposed adjacent to the first insertion hole in the width direction; and when a virtual straight line passing through the first portion and the second portion is taken as a virtual breaking line, the first frangible portion and the second frangible portion are disposed at positions through which the virtual breaking line passes, the plurality of hole rows include a third hole row provided at a position adjacent to the second long side surface;

the third hole row includes a fifth insertion hole and a sixth insertion hole adjacent to the fifth insertion hole in the longitudinal direction;

the virtual breaking line passes through a third portion positioned between the fifth insertion hole and the sixth insertion hole;

the virtual breaking line includes a third line portion positioned on the second long side surface and a fourth line portion positioned in the third portion; and when a line segment of the virtual breaking line positioned between the third line portion and the fourth line portion is taken as a second virtual line segment and a portion of the holder which is positioned close to the second long side surface with respect to the second virtual line segment is taken as a second region, at least a part of the second frangible portion is positioned in the second region when the second frangible portion is positioned adjacent to the virtual breaking line.

10. The power storage device according to claim 9, wherein:

the virtual breaking line includes a first line portion positioned on the first long side surface and a second line portion positioned in the first portion; and when a line segment of the virtual breaking line positioned between the first line portion and the second line portion is taken as a first virtual line segment and a portion of the holder which is positioned close to the first long side surface with respect to the first virtual line segment is taken as a first region, at least a part of the first frangible portion is positioned in the first region when the first frangible portion is positioned adjacent to the virtual breaking line.

11. The power storage device according to claim 9, wherein:
- the insertion holes of each of the hole rows are arranged in the longitudinal direction;
- each of the hole rows is arranged in the width direction; and
- the virtual breaking line passes through the portion positioned between the insertion holes in each of the hole rows.

12. The power storage device according to claim 9, wherein:
- the holder includes a third frangible portion on the first long side surface;
- when a virtual line passing through the second frangible portion and extending in the width direction is taken as a symmetrical virtual line, the first hole row includes a seventh insertion hole and an eighth insertion hole provided symmetrically with the first insertion hole and the second insertion hole with respect to the symmetrical virtual line;
- a fourth portion is included between the seventh insertion hole and the eighth insertion hole;
- the second hole row includes a ninth insertion hole and a tenth insertion hole provided symmetrically with the third insertion hole and the fourth insertion hole with respect to the symmetrical virtual line;
- a fifth portion is included between the ninth insertion hole and the tenth insertion hole; and
- when a virtual straight line passing through the fourth portion and the fifth portion is taken as another virtual breaking line, the third frangible portion is disposed at a position through which the other virtual breaking line passes, or adjacent to the other virtual breaking line.

* * * * *